(12) United States Patent
Uehara et al.

(10) Patent No.: US 7,621,665 B2
(45) Date of Patent: Nov. 24, 2009

(54) LIGHT SOURCE DEVICE, DISPLAY DEVICE, TERMINAL DEVICE, AND OPTICAL MEMBER

(75) Inventors: Shinichi Uehara, Tokyo (JP); Masao Imai, Tokyo (JP)

(73) Assignee: NEC Corporation, Tokyo (JP)

( * ) Notice: Subject to any disclaimer, the term of this patent is extended or adjusted under 35 U.S.C. 154(b) by 426 days.

(21) Appl. No.: 11/389,004

(22) Filed: Mar. 27, 2006

(65) Prior Publication Data

US 2006/0227569 A1    Oct. 12, 2006

(30) Foreign Application Priority Data

Mar. 28, 2005   (JP)   ............... 2005-091608

(51) Int. Cl.
*F21V 7/04*   (2006.01)
(52) U.S. Cl. ...................... 362/607; 362/606
(58) Field of Classification Search .......... 362/600–634
See application file for complete search history.

(56) References Cited

U.S. PATENT DOCUMENTS

| | | | | |
|---|---|---|---|---|
| 5,467,417 A | * | 11/1995 | Nakamura et al. | 362/620 |
| 5,719,649 A | * | 2/1998 | Shono et al. | 362/615 |
| 6,199,989 B1 | | 3/2001 | Maeda et al. | |
| 6,609,807 B2 | * | 8/2003 | Torihara et al. | 362/613 |
| 7,320,535 B2 | * | 1/2008 | Etori | 362/618 |
| 2002/0034710 A1 | * | 3/2002 | Morris et al. | 430/321 |
| 2003/0133301 A1 | * | 7/2003 | Mullen | 362/332 |

FOREIGN PATENT DOCUMENTS

| | | |
|---|---|---|
| CN | 1170191 C | 10/2004 |
| JP | 9-244018 A | 9/1997 |
| JP | 2001256816 A | 9/2001 |
| JP | 2003-215584 A | 7/2003 |
| JP | 2004325907 A | 11/2004 |

OTHER PUBLICATIONS http://www.appropedia.org/Cold_Cathode_Fluorescent_Lamps.*
Hiroshi Okada, "Monthly Display," Apr. 2004, pp. 14-21.

\* cited by examiner

*Primary Examiner*—Ali Alavi
*Assistant Examiner*—William J Carter
(74) *Attorney, Agent, or Firm*—Sughrue Mion, PLLC

(57) ABSTRACT

In the display device, a light source unit, a louver, a transparent/scattering state switching element, and a transmissive liquid crystal panel are provided in sequence, an optical waveguide and a cone sheet are provided to the light source unit, and a light source is disposed on the side of the optical waveguide. The light-exiting surface of the optical waveguide is made flat, and a tilted surface that is tilted to the side of the light source with respect to the light-exiting surface is formed in a light diffusing surface. A flat plate is provided to the cone sheet, and a plurality of circular cones are arranged two-dimensionally on the light-incident surface of the flat plate. The central axes of the circular cones are parallel to each other. The transparent/scattering state switching element is capable of switching between a state for transmitting incident light and a state for scattering the light. By this configuration, a light source device is obtained having high directivity, high luminance, and no limitations on the mounting position of the light source.

26 Claims, 22 Drawing Sheets

10 DEGREES

20 DEGREES

30 DEGREES

40 DEGREES

50 DEGREES

60 DEGREES

70 DEGREES

PRIOR ART

PRIOR ART

EMISSION ANGLE (DEGREES)
VERTICAL DIRECTION

EMISSION ANGLE (DEGREES)
HORIZONTAL DIRECTION

PRIOR ART

PRIOR ART

PRIOR ART

LIGHT SOURCE DEVICE, DISPLAY DEVICE, TERMINAL DEVICE, AND OPTICAL MEMBER

BACKGROUND OF THE INVENTION

1. Field of the Invention

The present invention relates to a light source device capable of switching the angle range of irradiation, to a display device provided with this light source device and capable of switching the angle range of visibility, to a terminal device equipped with this display device, and to an optical member used in the aforementioned light source device.

2. Description of the Related Art

Because of their thin profile, light weight, small size, low energy consumption, and other advantages, display devices that use liquid crystals have been widely deployed and used in a range of devices that includes monitors, televisions (TV: Television), and other large terminal devices; notebook-type personal computers, cash dispensers, vending machines, and other mid-sized terminal devices; and personal TVs, PDAs (Personal Digital Assistance: personal information terminal), mobile telephones, mobile gaming devices, and other small terminal devices. These liquid crystal display devices can be generally classified as transmissive, reflective, or transflective (using transmitted light and reflected light jointly) according to the type of light source used. Energy consumption can be reduced in the reflective type, since it can utilize external light in the display, but contrast and other aspects of display performance are inferior compared to the transmissive type. Therefore, transmissive and transflective liquid crystal display devices are currently in the mainstream. In transmissive and transflective liquid crystal display devices, a light source device is installed on the back surface of a liquid crystal panel, and a display is created using the light emitted by the light source device. Specifically, a light source device that is separate from the liquid crystal panel is essential in current mainstream liquid crystal display devices.

In the liquid crystal panel that is the primary component of a liquid crystal display device, information is displayed by using an electric field to control the orientation of liquid crystal molecules, but numerous modes have been proposed according to the combination of the type and initial orientation of the liquid crystal molecules, the direction of the electric field, and the like. Among these modes, the modes most often used in a conventional terminal device include an STN (Super Twisted Nematic) mode using a simple matrix structure, and a TN (Twisted Nematic) mode using an active matrix structure. However, a liquid crystal panel that uses these modes has a narrow range of angles in which contrasts can be correctly distinguished, and grayscale inversion occurs outside the optimum viewing position.

This problem of grayscale inversion was relatively insignificant in mobile telephones and other terminal devices when the display content consisted mainly of telephone numbers and other characters. However, with recent technological development, terminal devices have come to display not only text information, but also large amounts of image information. The visibility of images is therefore severely reduced by grayscale inversion. Liquid crystal panels that use a mode having a wide range of angles at which contrast can be correctly distinguished without the occurrence of grayscale inversion are therefore gradually being installed in terminal devices. Liquid crystal panels having this type of mode are referred to generically as wide-viewing-angle liquid crystal panels, and in-plane switching systems and other in-plane modes, multi-domain vertical alignment modes, and the like are applied therein. Since gradation can be correctly distinguished in a wide range of angles by using these wide-viewing-angle liquid crystal panels, even though a medium-sized terminal device is basically a personal tool, applications that can be appreciated by multiple people simultaneously and are designed for sharing information with others are being developed and gradually installed.

On the other hand, medium-sized terminal devices are characteristically used not only in closed rooms under tight security, but also in public places. It then becomes important to keep displays of private information and confidential information from being viewed by a third party. Particularly in recent years, occasions where private information and confidential information are displayed have increased in conjunction with the development of terminal devices, and demand for eavesdropping prevention techniques is increasing. There is therefore a desire for development of a technique capable of preventing eavesdropping, and enabling the display to be viewed only by the user, by narrowing the range of angles in which the display is visible.

As described above, it is desired to have both a display that has a wide range of viewing angles and can be appreciated by multiple people simultaneously, and a display that has a narrow range of viewing angles and can be viewed only by the user. The ability to switch between these two types of displays in a single terminal device is also desired. Therefore, in order to satisfy such requirements, a display has been proposed in which the light source device essential to the liquid crystal display device is designed so that the range of viewing angles can be changed.

FIG. 35 is a schematic sectional view showing the conventional viewing-angle-controlled liquid crystal display device described in Japanese Laid-Open Patent Application 9-244018; and FIG. 36 is a schematic perspective view showing an illumination device in which this viewing-angle-controlled liquid crystal display device is used. As shown in FIG. 35, the conventional viewing-angle-controlled liquid crystal display device 1101 is composed of a liquid crystal display element 1102; a scatter control element (scatter control means) 1103; and an illumination device (backlight) 1104. The scatter control element 1103 is disposed between the liquid crystal display element 1102 and the illumination device 1104. As shown in FIG. 36, the illumination device 1104 is provided with an opaque slitted sheet (translucent sheet) 1120 and an irradiating unit 1121. A fluorescent tube or other light source 1122 is provided to the irradiating unit 1121, and a reflecting sheet 1124 disposed on the surface facing the light-emitting surface 1123 is provided for reflecting the light from the light source 1122. The surface on the side of the opaque slitted sheet 1120 forms the light-emitting surface 1123 for emitting the light from the light source 1122 and guiding the light to the opaque slitted sheet 1120. In the opaque slitted sheet 1120, a plurality of linear opaque members that extend in one direction are arranged parallel to each other on one surface of a translucent sheet. The direction in which the opaque members extend coincides with the vertical direction of the display unit.

In the conventional viewing-angle-controlled liquid crystal display device configured as described in Japanese Laid-Open Patent Application 9-244018, the light emitted from the light source 1122 is radiated to the scatter control element 1103 via the opaque slitted sheet 1120. When the light emitted from the light-emitting surface 1123 passes through the opaque slitted sheet 1120, the opaque slitted sheet 1120 increases the collimation of the transmitted light. Therefore, there is no incidence of light to the scatter control element 1103 at angles that are significantly tilted with respect to the direction orthogonal to the light-incident surface. Specifically, transmitted light is obtained that is highly parallel to the direction orthogonal to the surface of the opaque slitted sheet 1120. The light emitted from the illumination device 1104 then enters the scatter control element 1103. The scatter control element 1103 controls the scattering properties of the incident light rays according to the presence of an applied voltage. When the scatter control element 1103 is in a scattering state, the light from the illumination device 1104 is scattered by the scatter control element 1103; and when the scatter control element 1103 is in a transmitting state, the light from the illumination device 1104 is not scattered.

In the viewing-angle-controlled liquid crystal display device 1101 configured as described above, when the scatter control element 1103 is in the scattering state, the highly collimated light emitted from the illumination device 1104 is scattered by the scatter control element 1103 and caused to enter the liquid crystal display element 1102. As a result, the light that has passed through the liquid crystal display element 1102 is released in all directions in the viewing angle of the display unit, and it becomes possible to recognize the displayed content also from positions other than the position directly in front of the display unit. In contrast, when the scatter control element 1103 is in the transmitting state, the highly collimated light emitted from the illumination device 1104 is caused to enter the liquid crystal display element 1102 while still maintaining a high degree of collimation, without being scattered by the scatter control element 1103. As a result, the transmitted light of the liquid crystal display element 1102 is not propagated to positions where the display unit is viewed at an angle to the left or right in the horizontal direction, the screen is darkened when viewed from such a position, and it becomes impossible to recognize the displayed content. By this configuration, only an observer who is directly facing the display unit can recognize the displayed content.

As described above, in the viewing-angle-controlled liquid crystal display device 1101 having the abovementioned configuration, the viewing angle characteristics of the displayed content can be controlled because the scattering properties of the light can be controlled by the scatter control element 1103. Specifically, since highly collimated light can be emitted towards the liquid crystal display element 1102 by the illumination device 1104, when the scatter control element 1103 is placed in the transmitting state, viewing angle characteristics can be reliably obtained in which only an observer directly facing the display unit can recognize the displayed content. Consequently, a liquid crystal display device can be obtained that is capable of arbitrarily switching between a state in which display characteristics are uniformly maintained in all viewing angle directions with little dependence on viewing angle, and a state in which the displayed content can be recognized only from a position directly facing the display unit.

A light source device having increased directivity has been investigated in the past. FIG. 37 is a schematic perspective view showing the first conventional high-directivity light source device cited on pages 14 through 21 of the April 2004 issue of *Monthly Display*. As shown in FIG. 37, the first conventional high-directivity light source device is composed of a light source 2101; an optical waveguide 2102 for propagating and emitting in planar fashion the light emitted by the light source 2101; a diffusing sheet 2103 disposed on the side of the light-exiting surface of the optical waveguide 2102; two prism sheets 2104 and 2105 disposed on the diffusing sheet 2103; a diffusing sheet 2106 disposed on the prism sheets; and a reflecting sheet 2107 disposed on the opposite side from the light-exiting surface of the optical waveguide 2102. A dot shape is printed on the surface of the optical waveguide 2102. A prism shape in a one-dimensional arrangement extending in one direction is formed in the two prism sheets 2104 and 2105. The apex angle of this prism shape is 90 degrees. The prism sheets 2104 and 2105 are also arranged so that the extension direction of the prism shape formed in the prism sheet 2104 and the extension direction of the prism shape formed in the prism sheet 2105 are orthogonal to each other. Furthermore, the prism sheets 2104 and 2105 are arranged so that the prism surfaces face upwards (the side opposite the optical waveguide).

In the first conventional high-directivity light source device that has this type of configuration and is cited on pages 14 through 21 of the April 2004 issue of *Monthly Display*, the light emitted from the light source 2101 enters the optical waveguide 2102, and is propagated in the optical waveguide 2102. A portion of the light is then scattered by a printed dot pattern and emitted from the emitting surface of the optical waveguide 2102. The uniformity ratio of illuminance of the light emitted from the optical waveguide 2102 is enhanced by the diffusing sheet 2103 disposed between the optical waveguide 2102 and the prism sheet 2104, and the light enters the prism sheets 2104 and 2105. Since the apex angle of the prism sheets 2104 and 2105 is 90 degrees, light rays directed near a 30-degree angle from the front refract and proceed in the front direction. As a result, the light rays are focused in the front direction, and the frontal luminance is enhanced.

FIG. 38 is a schematic perspective view showing the second conventional high-directivity light source device cited on pages 14 through 21 of the April 2004 issue of *Monthly Display*. As shown in FIG. 38, the second conventional high-directivity light source device is composed of a linear light source 3101; an optical waveguide 3102 for propagating and emitting in planar fashion the light emitted by the light source 3101; a prism sheet 3103 disposed on the side of the light-exiting surface of the optical waveguide 3102; and a reflecting sheet 3104 disposed on the opposite side from the light-exiting surface of the optical waveguide 3102. The optical waveguide 3102 is a matte prism optical waveguide in which a matte pattern shape (not shown in the drawing) is formed on the light-exiting surface thereof, and a row of prisms extending in the direction (hereinafter referred to as the direction orthogonal to the light source) orthogonal to the extension direction of the light source 3101 is formed on the surface of the reflecting sheet 3104 side, which is the surface on the opposite side. The prism sheet 3103 is arranged with the prism surface towards the side of the optical waveguide, and the extension direction of the prism rows is the direction (hereinafter referred to as the direction parallel to the light source) that is parallel to the extension direction of the light source.

In the second conventional high-directivity light source device that has this type of configuration and is cited on pages 14 through 21 of the April 2004 issue of *Monthly Display*, the light emitted from the light source 3101 enters the optical waveguide 3102 and is propagated in the optical waveguide 3102. A portion of the light is then excluded from the condition of total reflection by the matte pattern formed in the light-exiting surface, which is the surface on the side of the prism sheet of the optical waveguide 3102, and is emitted from the optical waveguide 3102. The light emitted from the optical waveguide 3102 is in a condition slightly removed from the total reflectance condition of the optical waveguide 3102, and is therefore highly directed light having a peak near 65 degrees from the normal to the emitting surface in the direction orthogonal to the light source. This light enters the prism sheet 3103, but is totally reflected by the tilted surface of the prism on the opposite side and emitted in the frontal direction after being refracted by the tilted surface of the prism on the incident side.

As previously mentioned, since the light that is incident on the prism sheet 3103 has high directivity in the direction orthogonal to the light source, the light emitted from the prism sheet also has high directivity with respect to the direction orthogonal to the light source. On the other hand, directivity in the direction parallel to the light source is ensured by forming a row of prisms extending in the direction orthogonal to the light source in the surface on the side of the reflecting sheet 3104 of the optical waveguide 3102.

FIGS. 39A and 39B are graphs showing the results of comparing the directivity characteristics of the second conventional high-directivity light source device with the directivity characteristics of the first conventional high-directivity light source device, wherein the horizontal axis represents the exit angle, and the vertical axis represents the light intensity. FIG. 39A shows the directivity in the vertical direction, and FIG. 39B shows the directivity in the horizontal direction. FIGS. 39A and 39B show what is described in FIG. 14 on pages 14 through 21 of the April 2004 issue of *Monthly Display*. As shown in FIGS. 39A and 39B, in the second conventional high-directivity light source device, the directivity is increased not only in the direction orthogonal to the light source, but also in the parallel direction, and directivity is increased more than by the first conventional high-directivity light source device.

FIG. 40 is a schematic perspective view showing the third conventional high-directivity light source device described in Japanese Laid-Open Patent Application 2003-215584, and FIG. 41 is a sectional view thereof. As shown in FIG. 40, the third conventional high-directivity light source device is primarily composed of an optical waveguide 4132, a light emitting unit 4133, a reflecting panel 4134, and a diffusing prism sheet 4135. The optical waveguide 4132 is formed in a square flat panel shape from polycarbonate resin, methacrylic resin, or another transparent resin, and an optical diffusion pattern 4136 is formed on the back surface thereof. A light-incident surface 4137 is formed in one location of the corner part of the optical waveguide 4132 by cutting the corner part at an angle, as viewed in a plane. In the light emitting unit 4133, one or more LEDs (Light Emitting Diode: light-emitting diode) are sealed in a transparent molded resin, and the surfaces other than the front surface of the molded resin are covered by a white resin. The light emitted from the LED is emitted from the front surface of the light emitting unit 4133 directly or after being reflected by the interface between the molded resin and the white resin.

This light emitting unit 4133 is disposed in a position in which its front surface faces the light-incident surface 4137 of the optical waveguide 4132. The optical diffusion pattern 4136 formed on the bottom surface of the optical waveguide 4132 is arranged in concentric arcs centered around the light emitting unit 4133 (particularly, the internal LED), and each optical diffusion pattern 4136 is formed in a curve by recessing the rear surface of the optical waveguide 4132 in the shape of an asymmetrical triangle in cross-section. The optical diffusion patterns 4136 also spread out along the circumferential direction of the arc having the light emitting unit 4133 at the center, and the reflecting surfaces of the optical diffusion patterns 4136 intersect with the direction that links the light emitting unit 4133 and the optical diffusion pattern 4136 as viewed in a plane. The optical diffusion pattern 4136 is also formed so that the pattern density gradually increases in the direction away from the light emitting unit 4133. The surface of the reflecting panel 4134 has a mirror finish formed from Ag plating, and is disposed so as to face the entire rear surface of the optical waveguide 4132. In the diffusing prism sheet 4135, a transparent textured diffusion panel 4139 is formed on the surface of a transparent plastic sheet 4138, and a transparent prism sheet 4140 is formed on the rear surface of the plastic sheet 4138.

In the third conventional high-directivity light source device that has this type of configuration and is described in Japanese Laid-Open Patent Application 2003-215584, the light p emitted from the light emitting unit 4133 enters the optical waveguide 4132 from the light-incident surface 4137, as shown in FIG. 41. The light p entering the optical waveguide 4132 from the light-incident surface 4137 spreads in radial fashion in the optical waveguide 4132, but the optical element 4144 formed in the light-incident surface 4137 is designed so that the light intensity in each direction of the light p spreading in the optical waveguide 4132 at this time is proportional to the surface area of the optical waveguide 4132 in each direction. The light p entering the optical waveguide 4132 is propagated within the optical waveguide 4132 in the direction away from the light emitting unit 4133 while repeatedly undergoing total reflection between the top surface and bottom surface of the optical waveguide 4132. The angle at which the light p incident on the bottom surface of the optical waveguide 4132 is incident on the top surface (light-exiting surface 4145) of the optical waveguide 4132 decreases each time the light is reflected by the optical diffusion pattern 4136 having the triangular cross-sectional shape, and the light p that is incident on the light-exiting surface 4145 at an incidence angle smaller than the critical angle of total reflection passes through the light-exiting surface 4145 and exits to the outside of the optical waveguide 4132. Each optical diffusion pattern 4136 is also arranged so as to be orthogonal to the direction linking the light emitting unit 4133 to each optical diffusion pattern 4136. Therefore, even when the light p propagated in the optical waveguide 4132 is diffused by the optical diffusion pattern 4136, the light p is diffused within the plane that is perpendicular to the optical waveguide 4132 and includes the direction linking the light emitting unit 4133 to the optical diffusion pattern 4136, but proceeds straight ahead without being diffused in the plane that is parallel to the tangent of the optical diffusion pattern 4136. The light p that has passed through the bottom surface without being reflected by the top surface of the optical waveguide 4132 is directly reflected by the reflecting panel 4134 facing the bottom surface of the optical waveguide 4132, is returned to the optical waveguide 4132, and is again propagated in the optical waveguide 4132. After the minimally diverged, highly-directed light emitted from the optical waveguide is bent towards the direction perpendicular to the light-exiting surface 4145 by passing through the prism sheet 4140 of the diffusing prism sheet 4135, and is then diffused to the appropriate degree by the textured diffusion panel 4139 of the diffusing prism sheet 4135, the light is emitted in the frontal direction with high directivity. High directivity is therefore achieved.

However, the conventional viewing-angle-controlled liquid crystal display device described above has such problems as the following. Specifically, in the conventional viewing-angle-controlled liquid crystal display device described in Japanese Laid-Open Patent Application 9-244018, the directivity of the light emitted from the irradiation unit of the illumination device is increased by using an opaque slitted sheet to block components that are obliquely incident at angles equal to or greater than a certain angle with respect to the light-incident surface. Therefore, the light emitted from the light source is utilized with low efficiency in this conventional display device. The highly directed light emitted from the opaque slitted sheet enters the scatter control element. In the case of a wide-angle display, the scatter control element is placed in the scattering state, and the high-directivity light is scattered in a wide range of angles. In this display device, since the light having high directivity in the frontal direction that has selectively passed through the opaque slitted sheet spreads in a wide range of angles, the luminance is significantly reduced at all angles, and the visibility of the display is significantly reduced in comparison to a normal illumination device that does not have an opaque slitted sheet.

The inventors conducted a concentrated investigation in order to overcome this problem. As a result, the inventors discovered that the amount of luminous flux transmitted by the opaque slitted sheet (hereinafter referred to as the light-direction regulating element) is effectively increased by increasing the directivity of the light emitted from the light source device (irradiation unit of the illumination device). Transmittance of the light-direction regulating element depends on the angle, so that the transmittance is highest in the frontal direction and gradually decreases as the size of the angle increases. This is because the apparent open area ratio of the opaque slits decreases as the angle increases. Specifically, by increasing the directivity of the light emitted from the light source device, and concentrating the luminous flux in the frontal direction in which the transmittance of the light-direction regulating element is high, the luminous flux passing through the light-direction regulating element can be increased. The directivity of the light emitted from the light source device is more preferably increased in two-dimensional fashion in the in-plane direction of the light-direction regulating element, but the transmitted luminous flux can be increased by at least increasing the directivity in the alignment direction of the opaque slits. The luminance can thereby be enhanced in all directions even when the scatter control element is in the scattering state.

Based on this discovery, the inventors conducted additional investigation of the conventional high-directivity light source device in order to enhance the luminance of the conventional viewing-angle-controlled liquid crystal display device during display in a wide field of view. As a result, it was determined that the enhancement of luminance is inadequate even when the conventional high-directivity light source device is used.

In the first conventional high-directivity light source device cited on pages 14 through 21 of the April 2004 issue of *Monthly Display*, the luminous flux that is emitted from the optical waveguide and endowed with more uniform luminance by the diffusion sheet is refracted by two orthogonally arranged prism sheets. As a result, the directivity in the frontal direction is increased, but even though the two prism sheets refract light rays directed near 30 degrees from the normal to the frontal direction, light rays at other angles are refracted or totally reflected in directions other than the frontal direction. The increase in directivity characteristics is therefore limited. As a result, the luminous flux transmitted by the light-direction regulating element is not adequately increased, and the luminance during wide-angle display cannot be adequately enhanced.

In the direction perpendicular to the light source in the second conventional high-directivity light source device cited on pages 14 through 21 of the April 2004 issue of *Monthly Display*, higher directivity can be achieved than in of the first conventional light source since the luminous flux having high directivity emitted from the optical waveguide is emitted in the frontal direction using the total reflection of the prism sheet. Directivity is increased in the direction parallel to the light source by a row of prisms that is provided to the side of the reflecting sheet of the optical waveguide and is directed perpendicular to the light source, but directivity in the direction perpendicular to the light source is low, and the increase in the two-dimensional light condensation properties is limited. Consequently, when this light source device is installed in the display device of a mobile telephone, the direction perpendicular to the high-directivity light source preferably runs to the left and right of the display screen. The light source of the light source device is then disposed on the left and right of the display screen. However, since the chassis is made thinner in a normal mobile telephone, it is impossible to place the light source on the left and right of the display screen. The light source is therefore placed above and below the display screen when the second conventional high-directivity light source device is applied to a mobile telephone, but then it is impossible to increase the directivity in the left/right direction. As a result, the luminous flux transmitted by the light-direction regulating element is not adequately increased, and the luminance during wide-angle display cannot be adequately enhanced.

Furthermore, in the third conventional high-directivity light source device described in Japanese Laid-Open Patent Application 2003-215584, the two-dimensional light focusing properties can be increased by making the light source a point light source, and by using an optical waveguide and diffusion prism sheet in which a pattern of concentric circles is arranged around the light source. By this configuration, the ratio of luminous flux transmitted by the light-direction regulating element can be increased. However, the light source must be concentrated in one location, and the intensity of a normal LED light source is inadequate. The intensity of the light source is increased when a light source is used in which a plurality of LED are housed in a single package, but the integration of the light source is limited by the problem of heat emission. As a result, the luminous flux transmitted by the light-direction regulating element is not adequately increased, and the luminance during wide-angle display cannot be adequately enhanced.

SUMMARY OF THE INVENTION

An object of the present invention is to provide a light source device capable of switching the range of radiation angles, wherein the light source device has high directivity, high luminance, and no limitations on the mounting position of the light source; to provide a display device in which this light source is installed and which has high display luminance and the capability of switching the range of viewing angles; to provide a terminal device in which this display device is installed; and to provide an optical member that is incorporated into the light source device.

The light source device according to the present invention has a light source; a light guiding member for emitting the light incident from the light source in a first direction that is different from the incidence direction of the light; an optical member for emitting the light incident from the light guiding member in a second direction that is different from the first direction; a light-direction regulating element for regulating the direction of the light incident from the optical member, and emitting the light; and a transparent/scattering state switching element capable of switching between a state of transmitting the light incident from the light-direction regulating element, and a state of scattering the light. The light source is disposed along the light-incident surface of the light guiding member; the optical member has a plurality of optical elements in a two-dimensional arrangement on the light-incident surface thereof; and the incident light is emitted with increased directivity in the direction orthogonal to the plane that includes the incidence direction and the first direction.

In the present invention, the light guiding member increases the directivity of light in the plane that includes the incidence direction and the first direction, and the optical member increases the directivity of light in the direction orthogonal to the aforementioned plane. Therefore, the light emitted from the light source can be emitted with two-dimensionally increased directivity. Since the present invention also has a light-direction regulating element, the directivity of the light can be even further increased. Furthermore, since a majority of the light emitted from the light source can be emitted in a second direction from the optical member, the light is utilized with high efficiency, and the light has high luminance. There is also a high degree of freedom in the mounting position of the light source. Since the optical element is also arranged two-dimensionally in the optical member, light that is incident in a first direction can be emitted in a second direction, and directivity in the direction orthogonal to the aforementioned plane can be increased by a single optical member. Furthermore, the range of viewing angles in which an image can be recognized on the display device can be switched between two stages by adopting an approach in which the radiation angle of light emitted from the display device is narrowed by placing the transparent/scattering state switching element in a transparent state and transmitting light, and in which the radiation angle of light emitted from the display device is widened by placing the transparent/scattering state switching element in a scattering state.

A configuration may be adopted whereby the optical member has a flat plate composed of a transparent material, the optical element is formed on the flat plate and composed of a plurality of circular cones formed from a transparent material; the circular cones are formed on the surface of the flat plate facing the light guiding member; and the central axes thereof are parallel to each other.

At this time, the phase of one row that comprises the apex points of the circular cones in the optical member preferably differs from the phase of the other rows. It is preferred that the direction of the imaginary straight line linking the apex points of the circular cones be parallel to the surface of the flat plate, and comprise three mutually different directions. By this configuration, the occurrence of moiré can be minimized when the optical member is used in combination with a display panel.

The central axes of the circular cones are preferably tilted with respect to the direction perpendicular to the surface of the flat plate so that the second direction is perpendicular to the surface of the flat plate. By this configuration, the center of the intensity distribution of the light emitted from the light source device can be placed in the direction perpendicular to the flat plate of the cone sheet.

Furthermore, a diffusion pattern for diffusing the transmitted light may be formed on the surface of the side on which the circular cones are not formed in the flat plate. The light source may also comprise a point light source, and a diffusion pattern for diffusing the light may be formed on the surface of the light guiding member on which light from the point light source is incident. By this configuration, a point light source can be made into a uniform linear light source, and the uniformity of the in-plane distribution of emitted light can be enhanced in the light source device.

Furthermore, the light guiding member may comprise an optical waveguide on which the light is incident from the side surface thereof, and a tilted surface that is tilted to the side of the light source with respect to the light-emitting surface may be formed on the surface of the opposite side of the light-emitting surface facing the optical member in the optical waveguide. By this configuration, the directivity of light emitted from the light guiding member can be increased in the plane that includes the first direction and the incidence direction of the light.

Furthermore, the light source device according to the present invention preferably has a reflecting sheet disposed on the side opposite from the side on which the optical member is disposed as viewed from the light guiding member. The luminance of the light can thereby be further enhanced.

In this instance, a configuration may be adopted whereby transparent areas for transmitting the light and absorbent areas for absorbing the light are arranged in alternating fashion along the direction that intersects the incident direction of the light in the light-direction regulating element; and the light-direction regulating element regulates the angle range of light in the arrangement direction.

The light-direction regulating element may also have first and second layers layered on each other so that the arrangement direction of the transparent areas and absorbent areas in the first layer is orthogonal to the arrangement direction of the transparent areas and absorbent areas in the second layer. The directivity of the light can thereby be even further enhanced in two dimensions.

The transparent areas for transmitting light may be arranged in a matrix in the absorbent areas for absorbing light as viewed from the incidence direction of the light in the light-direction regulating element. At this time, the shape of the transparent areas may be circular, elliptical, square, or rectangular as viewed from the incidence direction of the light.

The boundaries between the transparent areas and the absorbent areas are preferably parallel to the second direction. Light can thereby be transmitted with enhanced efficiency.

Furthermore, the arrangement direction of the transparent areas is preferably tilted with respect to the arrangement direction of the optical element. Moiré that occurs due to the light-direction regulating element and the optical member can thereby be reduced.

The light-direction regulating element may also be integrally formed with the optical member. By this configuration, the thickness of the display device can be reduced.

The display device according to the present invention comprises the light source device; and a display panel for associating an image with the light by transmitting the light emitted from the light source device.

By the present invention, since the luminance of the light source device is high, a display device can be obtained that is capable of switching the range of viewing angles, and that has a high degree of luminance.

Furthermore, the pixel arrangement direction of the display panel is preferably tilted with respect to the arrangement direction of the optical element. Moiré that occurs due to the display panel and the optical member can thereby be reduced.

The display panel may also be a liquid crystal panel. In this case, the liquid crystal panel preferably operates on a lateral field principle, a multi-domain vertical alignment principle, or a film-compensated TN principle. By this configuration, grayscale inversion can be minimized in the display, and visibility can be enhanced when the transparent/scattering state switching element is in the scattering state.

An essential feature of the terminal device according to the present invention is that the terminal device has the aforementioned display device. This terminal device may also be a mobile telephone, a personal information terminal device, a gaming device, a digital camera, a video camera, a video player, a notebook-type personal computer, a cash dispenser, or a vending machine.

When the terminal device is a mobile telephone, the light source is preferably disposed on the top side or bottom side of the display screen. By this configuration, there is no need to maintain a space for placement of the light source to the left and right of the display screen in this mobile telephone, and a thin chassis and large screen can be obtained at the same time.

The optical member according to the present invention has a light-direction regulating element for regulating the direction of incident light and emitting the light; and a plurality of circular cones composed of a transparent material integrally formed on the light-direction regulating element.

By the present invention, the light guiding member increases the directivity of light in the plane that includes the incidence direction and the first direction, and the optical member increases the directivity of light in the direction orthogonal to the aforementioned plane. A light source device is thereby obtained that has high directivity, high luminance, no limitations on the mounting position of the light source, and the ability to switch the range of viewing angles. By using this light source device, a display device can be obtained that has high display luminance and that is capable of switching the range of viewing angles.

BRIEF DESCRIPTION OF THE DRAWINGS

FIG. 5 is a perspective view showing an optical model of a case in which the light source is on;

FIG. 39A shows the directivity in the vertical direction; and FIG. 39B shows the directivity in the horizontal direction;

DESCRIPTION OF THE PREFERRED EMBODIMENTS

Figure 1:
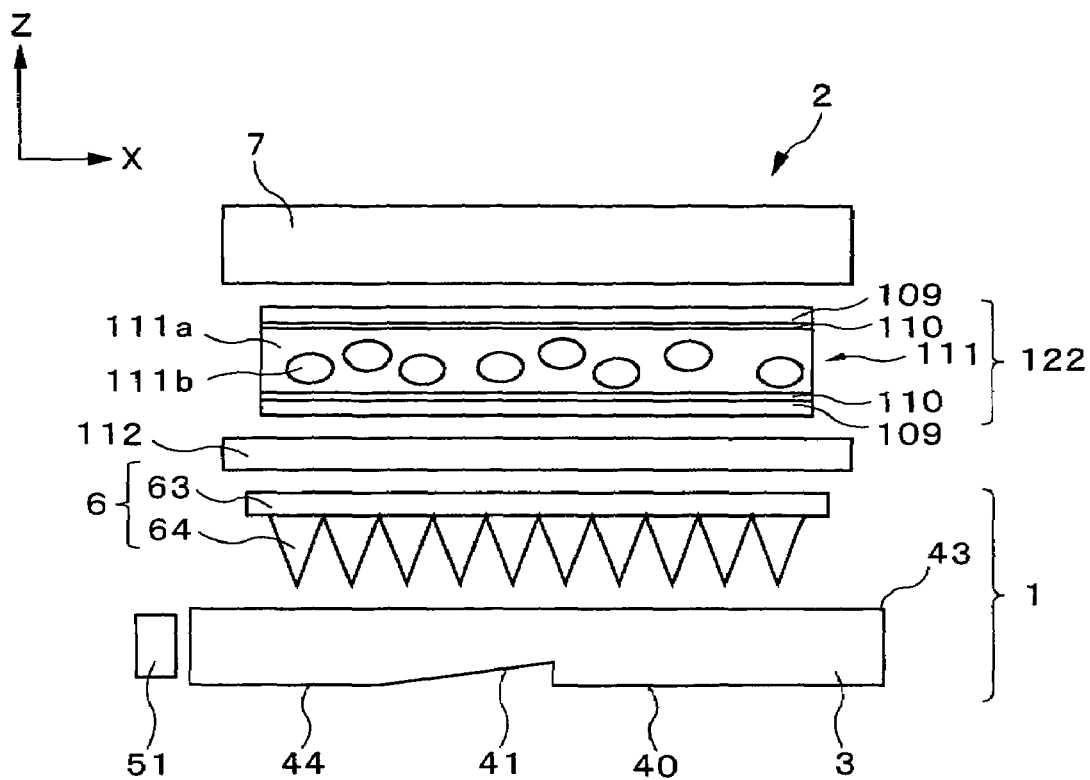
FIG. 1 is a sectional view showing the display device according to a first embodiment of the present invention.
Figure 2:
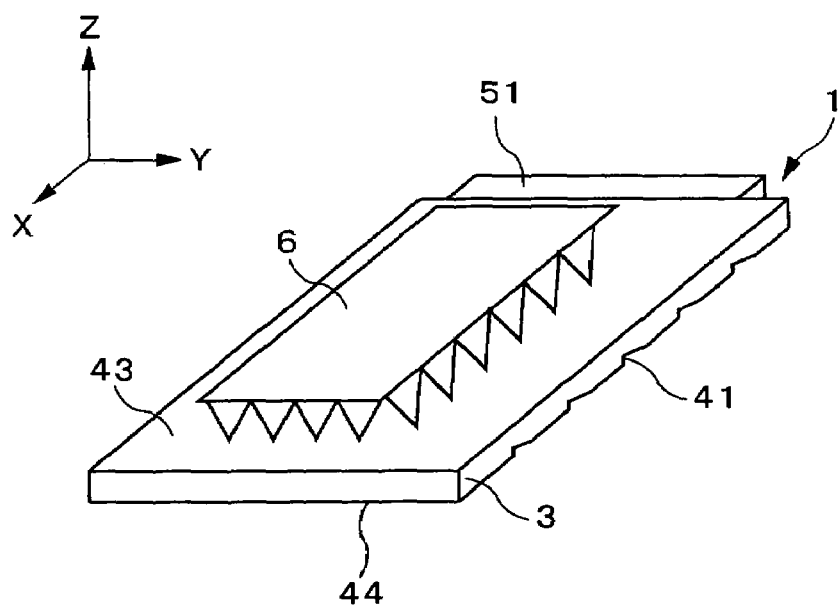
FIG. 2 is a perspective view showing the light source unit of the light source device according to the first embodiment of the present invention.
Figure 3:
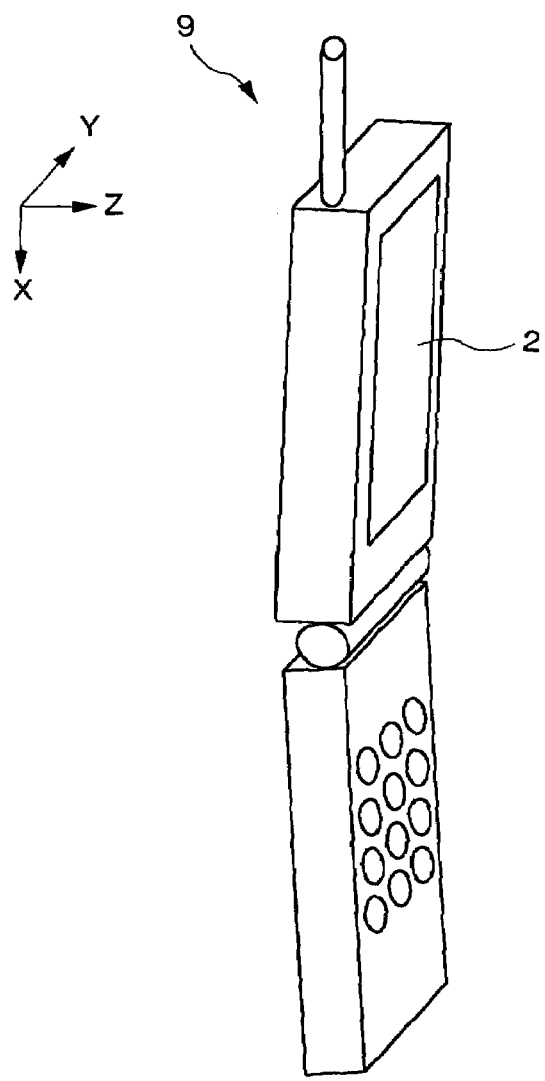
FIG. 3 is a perspective view showing a mobile terminal device equipped with the display device according to the first embodiment of the present invention.
Figure 4:
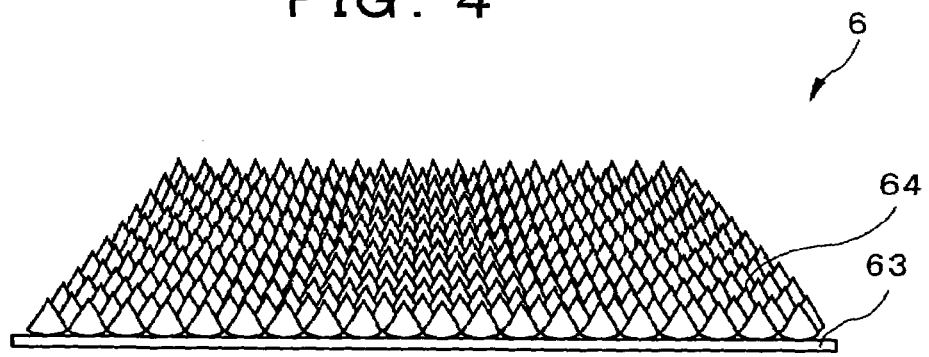
FIG. 4 is a perspective view showing the cone sheet used in the light source device according to the first embodiment of the present invention.

The light source device, display device, terminal device, and optical member according to embodiments of the present invention will be described in detail hereinafter with reference to the accompanying drawings. The light source device, display device, terminal device, and optical member according to a first embodiment of the present invention will first be described. FIG. 1 is a sectional view showing the display device according to the present embodiment; FIG. 2 is a perspective view showing the light source unit of the display device; FIG. 3 is a perspective view showing a mobile terminal device equipped with the display device of the present embodiment; and FIG. 4 is a perspective view showing the cone sheet used in the light source device of the present embodiment.

As shown in FIG. 1, a light source unit 1 is provided in the display 2 according to the present first embodiment, and a louver 112 (light-direction regulating element) is provided on the light source unit 1. A transparent/scattering state switching element 122 is provided on the louver 112, and a transmissive liquid crystal panel 7 is provided on the transparent/scattering state switching element 122. The light source unit 1, louver 112, and transparent/scattering state switching element 122 constitute the light source device of the radiation angle switching type according to the present embodiment.

As shown in FIG. 1 and FIG. 2, an optical waveguide 3; a cone sheet 6 disposed on the front surface side of the optical waveguide 3, specifically, on the side of the viewer; and a light source 51 disposed on the side surface of the optical waveguide 3 are provided in the light source unit 1. The front surface of the optical waveguide 3, specifically, the surface on the side of the cone sheet 6, is the light-exiting surface 43. The opposite side, specifically, the back side, is the light-diffusing surface 44. The light-exiting surface 43 is flat. A tilted surface 41 tilted towards the light source 51 with respect to the light-exiting surface 43 is formed in the light-diffusing surface 44. By this configuration, the tilted surface 41 is directly irradiated by the light that radiates from the light source 51 and is incident on the optical waveguide 3. The light source 51 is composed of a plurality of LED arranged at substantially equal intervals along the side surface, which is the surface of the optical waveguide 3 on which light is incident.

An XYZ orthogonal coordinate system is set up as described below for convenience in the present specification. The direction from the light source 51 to the optical waveguide 3 is the +X direction, and the opposite direction is the −X direction. The +X direction and the −X direction are collectively referred to as the X-axis direction. Within the direction parallel to the light-exiting surface 43 of the optical waveguide 3, the direction orthogonal to the X-axis direction is the Y-axis direction. Furthermore, the direction that is orthogonal to both the X-axis direction and the Y-axis direction is the Z-axis direction; and within the Z-axis direction, the direction from the light-diffusing surface 44 to the light-exiting surface 43 is the +Z direction, and the opposite direction is the −Z direction. The +Z direction is the frontal direction, specifically, the direction towards the viewer. The +Y direction is the direction in which a right-handed coordinate system is established. Specifically, when the person's right thumb is in the +X direction, and the index finger is in the +Y direction, the middle finger is in the +Z direction.

As described above, when the XYZ orthogonal coordinate system is set up, the light-exiting surface 43 of the optical waveguide 3 becomes the XY plane, the light source 51 is disposed in the −X direction as viewed from the optical waveguide 3, and the cone sheet 6 is disposed in the +Z direction. The light source 51 is a diffuse light source, and the light radiated from the light source 51 is diffused at least in the XY direction inside the optical waveguide 3.

In the louver 112, transparent areas 112a (see FIG. 19) for transmitting light and absorbent areas 112b (see FIG. 19) for absorbing light, for example, are formed and arranged in alternating fashion in the direction parallel to the surface of the louver 112. The transparent areas 112a and absorbent areas 112b are belt-shaped areas extending in the X-axis direction, for example, and the side surfaces thereof are parallel to the Z-axis direction. The arrangement direction in which the transparent areas 112a and absorbent areas 112b are arranged in alternating fashion is the Y direction shown in FIG. 1.

A pair of transparent substrates 109 arranged parallel to each other is provided in the transparent/scattering state switching element 122, and electrodes 110 are provided so as to cover the surface in each transparent substrate that faces the other transparent substrate. A PDLC (Polymer Dispersed Liquid Crystal: polymer dispersed liquid crystal) layer 111 in which liquid crystal molecules 111b are dispersed in a polymer matrix 111a is provided between the electrodes 110. The orientation state of the liquid crystal molecules in the PDLC layer is changed by using the pair of electrodes 110 to apply a voltage to the PDLC layer 111 sandwiched between the electrodes. The PDLC layer 111 is formed, for example, by curing a mixture of a photocuring resin and a liquid crystal material by exposure to light. The transparent/scattering state switching element 122 scatters or transmits light that is incident from the louver 112, and emits the light to the transmissive liquid crystal panel 7.

As shown in FIG. 1, a tilted surface 41 and a flat surface 40 are repeatedly arranged in sequence in the +X direction in the light-diffusing surface 44 of the optical waveguide 3. Only one instance of the tilted surface 41 is shown in FIG. 1 in order to simplify the drawing, but the tilted surface 41 is actually formed in a plurality of locations, as previously mentioned. The tilted surface 41 is tilted towards the light source 51; specifically, in the direction in which the tilted surface 41 is irradiated by light that is emitted from the light source 51 and transmitted in the +X direction inside the optical waveguide 3. The absolute value of the tilt angle of the tilted surface 41 is 6 degrees, for example. The boundary of the transition from the tilted surface 41 to the flat surface 40 in the +X direction forms a step in the Z-axis direction. The flat surfaces 40 and tilted surfaces 41 extend throughout the entire length of the optical waveguide 3 along the Y-axis direction.

As shown in FIGS. 1 and 4, a flat plate 63 composed of a transparent material is provided in the cone sheet 6, and a plurality of cones 64 are formed on the back surface of the flat plate 63. The flat plate 63 is arranged parallel to the XY plane, and the cones 64 protrude in the −Z direction, that is, towards the optical waveguide 3. Specifically, the central axes of the cones 64 are parallel to each other, and are parallel to the Z-axis direction. The apex points of the cones 64 are arranged along the two directions that include the Y-axis direction and a direction angled 60 degrees with respect to the Y-axis direction in the XY plane. Specifically, the cones 64 are arranged in two dimensions on the light-incident surface of the flat plate 63, and the extension direction of an imaginary straight line that connects the apex points of the cones 64 makes a total of three directions that include the Y-axis direction and the direction 60 degrees with respect to the Y-axis direction in the XY plane. By this configuration, when the apex points of three mutually adjacent cones 64 are connected, an imaginary equilateral triangle is formed having one side that extends in the Y-axis direction.

In an example, the apex points of the cones 64 are arranged at an equal pitch in the Y-axis direction with an interval of 50 μm, and the side of the equilateral triangle formed by the apex points of the cones is 50 μm in length. The apex angle of the cones 64 is 70 degrees, and the height of the cones is 36 μm. The term "apex angle" refers to the angle formed by the sides of two cones in the cross-section that includes the central axes of the cones 64. A transparent resin is appropriate for use as the material of the optical waveguide 3 and cone sheet 6 due to its easy workability, but polymethyl methacrylate (PMMA: polymethyl methacrylate) having a refractive index of 1.5 is used in the present embodiment.

As shown in FIG. 3, the display device 2 according to the present embodiment is installed in a mobile telephone 9, for example. The display device 2 is arranged so that the transverse direction and the longitudinal direction of the mobile telephone 9 correspond to the Y-axis direction and the X-axis direction, respectively, of the light source device. Specifically, the light source 51 in the mobile telephone 9 (see FIG. 1) is disposed on the top side of the display screen. The light source 51 may also be disposed on the bottom side of the display screen.

Figure 5:
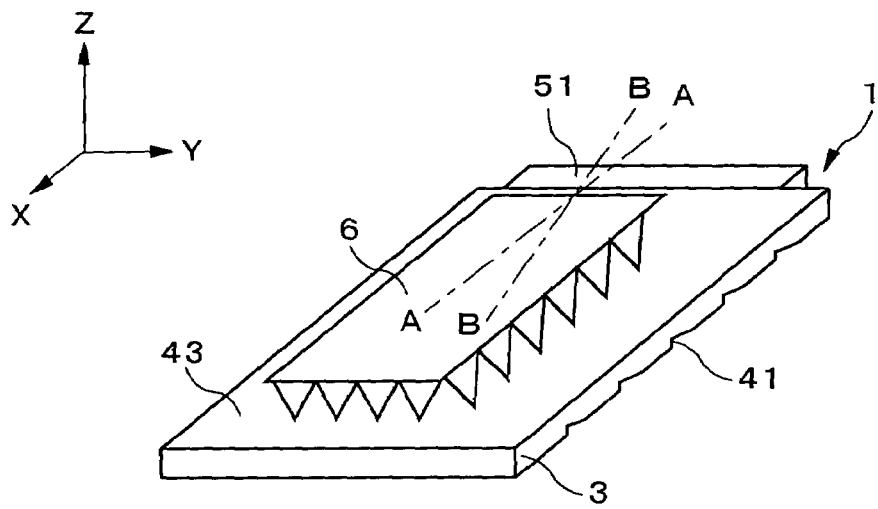
Figure 6:
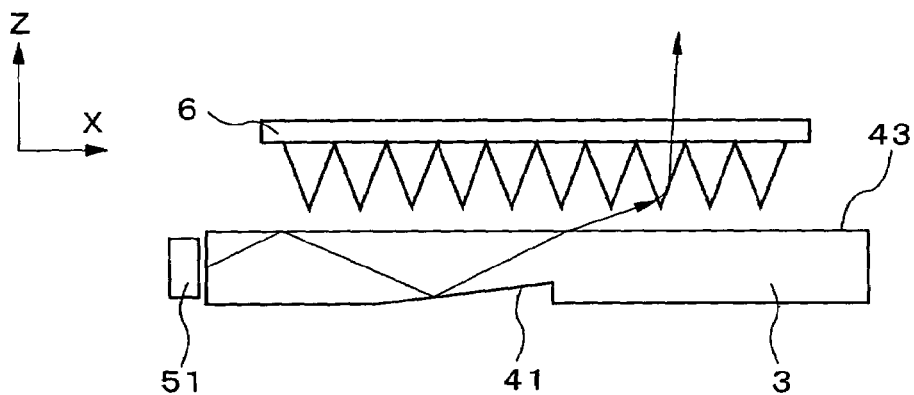
FIG. 6 is an optical model diagram of the cross-section along line A-A shown in FIG. 4.
Figure 7:
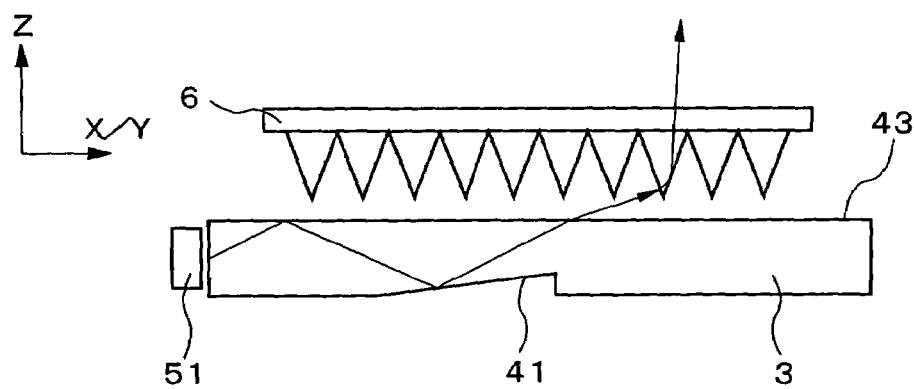
FIG. 7 is an optical model diagram of the cross-section along line B-B shown in FIG. 4.

The operation of the display device 2 of the present embodiment thus configured will next be described, but the operation of the light source unit 1 will be described first. FIG. 5 is a perspective view showing an optical model of a case in which the light source 51 is on; FIG. 6 is a sectional view along line A-A shown in FIG. 5; and FIG. 7 is sectional view along line B-B shown in FIG. 5. Line A-A extends in the X-axis direction, and line B-B extends in the direction that forms a 30-degree angle from the X-axis direction in the XY plane. Only one instance of the tilted surface 41 is shown in FIGS. 6 and 7 in order to simplify the drawings.

The behavior of light in the cross-section along line A-A shown in FIG. 6 will be described. The light emitted by the light source 51 is incident on the optical waveguide 3, but due to the difference in refractive index between the air and the resin material of the optical waveguide 3, the angle formed in the Z-axis direction by the +X direction and the direction in which the light is propagated after entering the optical waveguide 3 is reduced by 41.8 degrees based on Snell's law. Therefore, light rays will be considered that are tilted 41.8 degrees in the +Z direction with respect to the +X direction.

Light rays emitted from the light source 51 and directed to the optical waveguide 3 reach the light-exiting surface 43 of the optical waveguide 3, but since the angle thereof with respect to the Z-axis direction is 48.2 degrees, which is larger than the critical angle of 41.8 degrees, the light rays undergo total reflection without exiting from the optical waveguide 3. In the same manner, since total reflection also occurs in the light-diffusing surface 44 at the same angle when the light rays are incident on areas other than the tilted surface 41, the light rays are propagated away from the light source 51 while undergoing repeated total reflection between the light-exiting surface 43 and the light-diffusing surface 44. During this propagation, when the light is incident on the tilted surface 41 that is tilted 6 degrees with respect to the X-axis direction, the angle from the normal line of the tilted surface 41 becomes 42.2 degrees, but since this value is larger than the critical angle of 41.8 degrees, the light undergoes total reflection without exiting to the outside of the optical waveguide 3 from the tilted surface 41. The angle with respect to the Z-axis direction of the totally reflected light becomes 36.2 degrees, which is smaller than the critical angle. Therefore, the light that reaches the light-exiting surface 43 is emitted to the outside from the optical waveguide 3, and the angle after this emission is 62.4 degrees with respect to the Z-axis direction.

As previously mentioned, the light that has entered the optical waveguide 3 is always at an angle of 41.8 degrees or less with respect to the X-axis direction after incidence. The angle of this incident light therefore is 48.2 degrees or higher with respect to the Z-axis direction when the light reaches the light-exiting surface 43 or the light-diffusing surface 44, and the light is totally reflected. In the process by which this light is then totally reflected in the light-exiting surface 43 and light-diffusing surface 44 and propagated through the optical waveguide 3, the angle at which the light proceeds with respect to the Z-axis direction approaches the critical angle each time the light is totally reflected by the tilted surface 41 having a 6-degree tilt angle, and the light is emitted from the flat surface of the light-exiting surface 43 or light-diffusing surface 44 as soon as this angle becomes smaller than the critical angle. As a result, the light emitted from the optical waveguide 3 has strong directivity in the direction that is angled 60 degrees from the +Z direction in the XZ plane.

The light emitted at an angle of 62.4 degrees with respect to the Z-axis direction from the optical waveguide 3 enters the cone sheet 6. However, since the apex angle of the cones 64 is 70 degrees, the angle at which the light enters the cones 64 is 7.4 degrees, and the angle between the normal line of the incident surface of the cones and the propagation direction of the light rays entering into the cones 64 becomes 4.9 degrees. The light then reaches the side surface on the opposite side of the cones 64, but since the angle with respect to this side surface is 65.1 degrees from the surface-normal line, the light undergoes total reflection and proceeds in the direction 11.1 degrees from the Z-axis. The angle of the light emitted from the cone sheet 6 is then 16.8 degrees from the Z-axis, according to Snell's law. Specifically, the light emitted from the cone sheet 6 has strong directivity in the direction 16.8 degrees from the Z-axis in the XZ plane.

The behavior of light in the cross-section along line B-B shown in FIG. 7 will next be described. As previously mentioned, since the light source 51 is diffused at least in the XY plane, exactly the same theory applies in the cross-section along line B-B as in the cross-section along line A-A. As a result, the light emitted from the cone sheet 6 has high directivity, and is at an angle 16.8 degrees from the +Z direction. This result occurs not only for line B-B, but also in the same manner for other angles within the XY plane. Therefore, the light emitted from the cone sheet 6 has high directivity in the direction tilted 16.8 degrees from the +Z direction. Specifically, the radiation range of the light source unit 1 is limited to a narrow range of angles.

Figure 8:
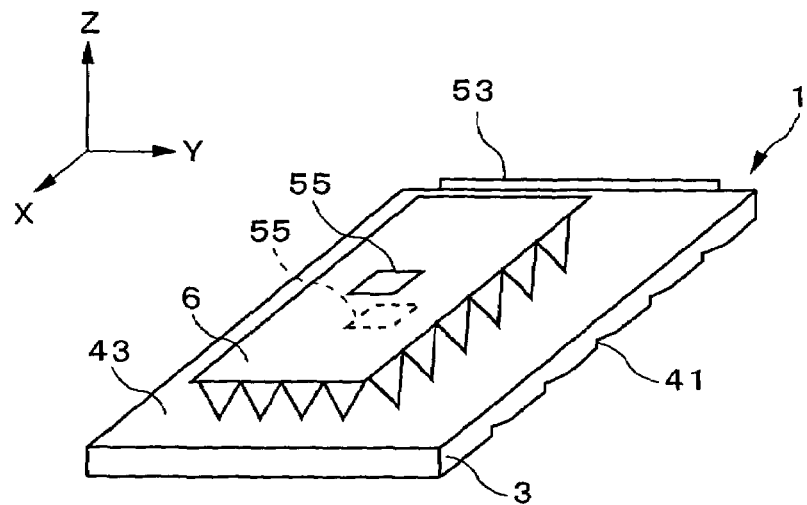
FIG. 8 is an optical model diagram for computer simulation in the first embodiment of the present invention.

A computer simulation was performed using a commercially available ray tracing simulator in order to investigate the validity of the design described above. FIG. 8 is a diagram showing the optical model used in this simulation. As shown in FIG. 8, the length in the X-axis direction, the width in the Y-axis direction, and the height in the Z-axis direction of the optical waveguide 3 were designed to be 60 mm, 40 mm, and 0.6 mm, respectively, and the light-emitting surface 53 as the light source was placed in the YZ plane on the side of the −X direction of the optical waveguide 3 so that the incidence direction was the +X direction. The width in the Y-axis direction of the light-emitting surface 53 was 40 mm, and the height in the Z-axis direction was 0.5 mm. A light-emitting surface that emitted Lambert light was used.

The tilted surface 41 was formed in the XY plane on the side of the −Z direction of the optical waveguide 3. The tilted surface 41 was tilted at an angle of 6 degrees from the +X direction to the +Z direction, and the tilted surfaces were arranged so as to be continuous in the Y-axis direction. The maximum value of the depth of the Z-axis direction in the tilted surface 41 was set to 10 μm, and the pitch in the X-axis direction was set to 0.2 mm.

A cone sheet 6 that faced downward and had a plurality of cones with apex points facing in the −Z direction was provided on the side of the +Z direction as viewed from the optical waveguide 3. The cones were arranged so that the apex points of the cones formed equilateral triangles when viewed from the −Z direction, and so that one side thereof was parallel to the Y-axis direction. The pitch in the Y-axis direction of the cone apex points was 50 μm, and the length of the sides of the equilateral triangles formed by the apex points of the cones was 50 μm. The apex angle of the cones was set to 70 degrees, and the height was set to 36 μm. The thickness of the cone sheet 6, including the cone portions, was 0.1 mm, and a light-receiving surface 55 having a length of 10 mm in the X-axis direction and a width of 10 mm in the Y-axis direction was installed on the side of the +Z direction of the cone sheet 6. A light-receiving surface 55 having the same size was also installed between the optical waveguide 3 and the cone sheet 6 for the purpose of observing the intensity distribution of the light emitted from the optical waveguide 3. Polymethyl methacrylate having a refractive index of 1.5 was used as the material for the optical waveguide 3 and the cone sheet 6.

Figure 9:
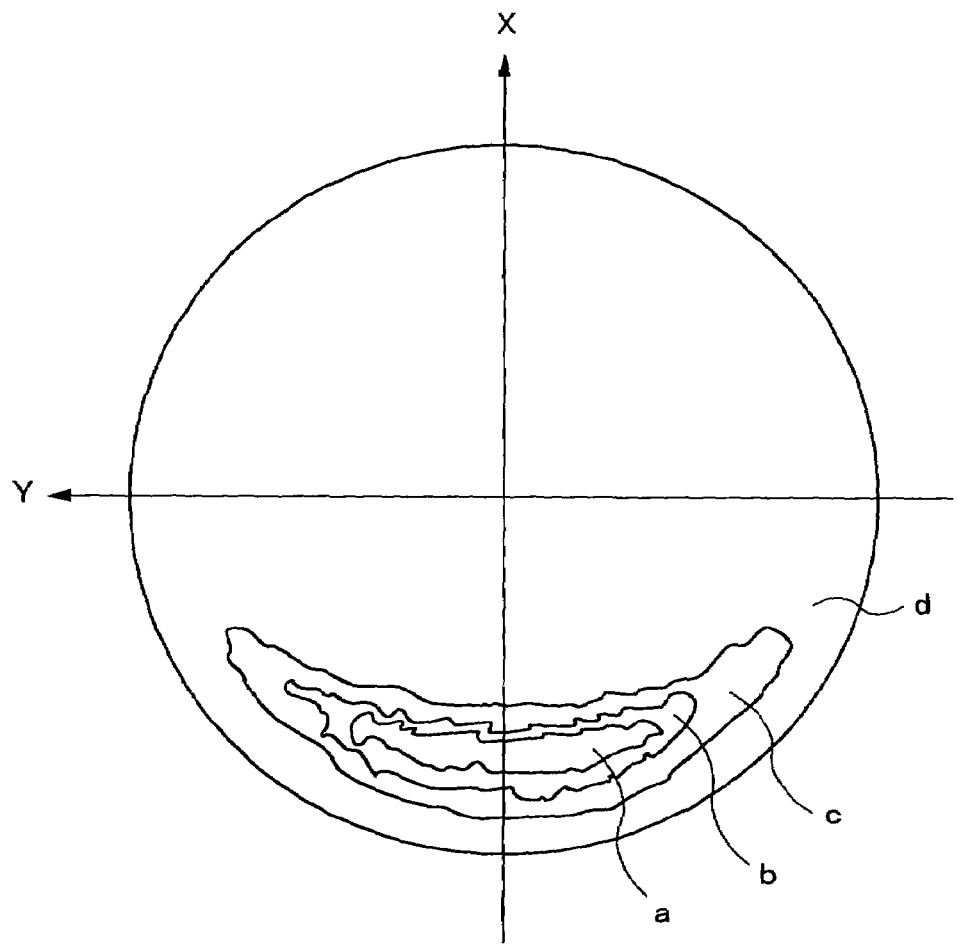
FIG. 9 is a diagram showing the simulation results when the light source is on in the first embodiment of the present invention, and particularly shows the intensity distribution of the light when emitted from the optical waveguide.
Figure 10:
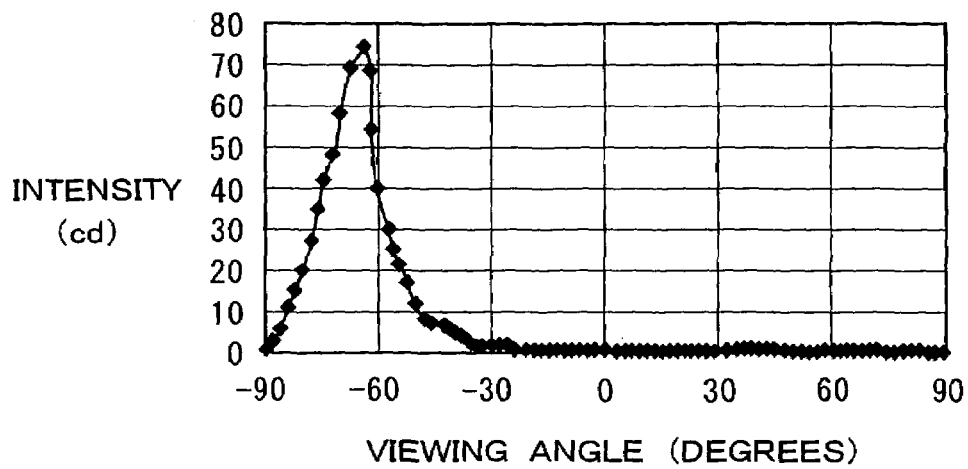
FIG. 10 is a graph showing the light intensity distribution of the X-axis direction in the light intensity distribution shown in FIG. 9, wherein the horizontal axis represents the viewing angle in the X-axis direction, and the vertical axis represents the light intensity.
Figure 11:
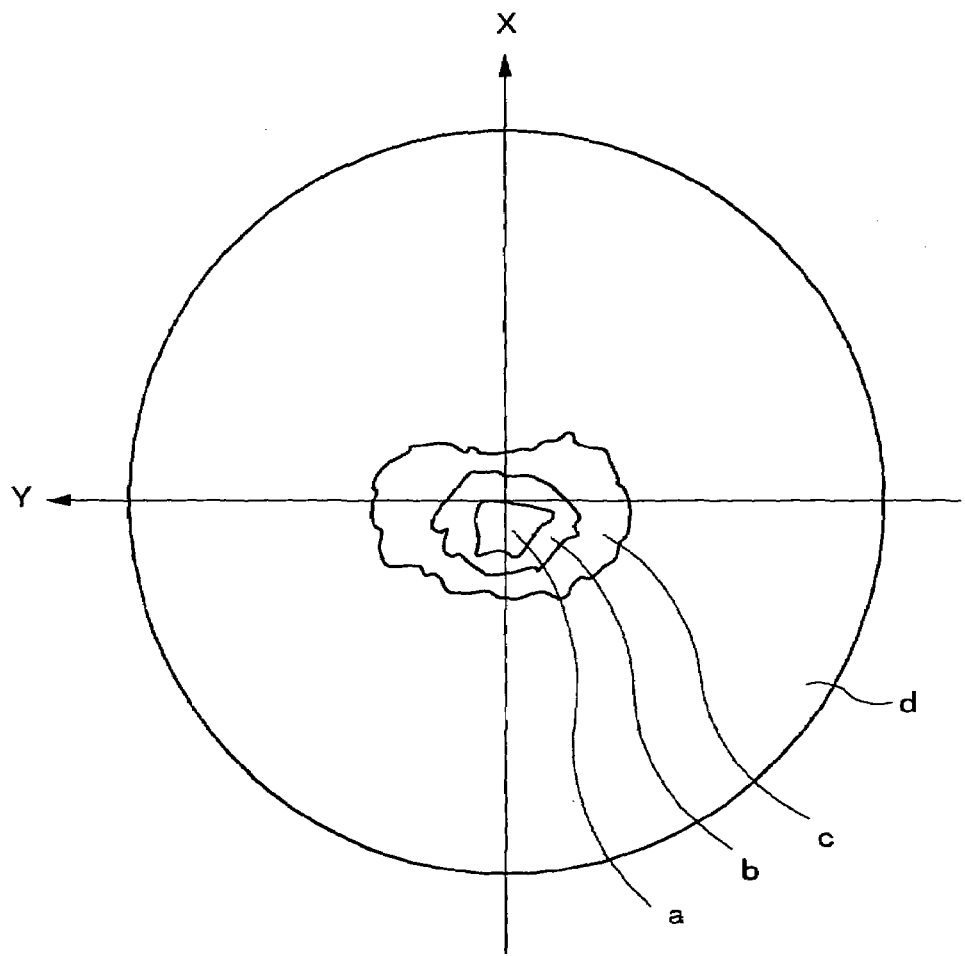
FIG. 11 is a diagram showing the simulation results when the light source is on in the first embodiment of the present invention, and particularly shows the intensity distribution of the light when emitted from the cone sheet.
Figure 12:
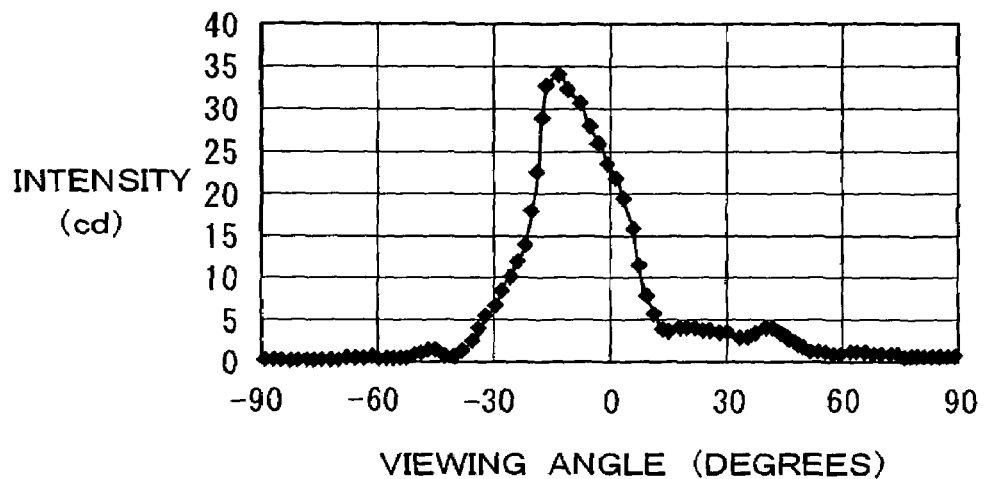
FIG. 12 is a graph showing the light intensity distribution of the X-axis direction in the light intensity distribution shown in FIG. 11, wherein the horizontal axis represents the viewing angle in the X-axis direction, and the vertical axis represents the light intensity.
Figure 13:
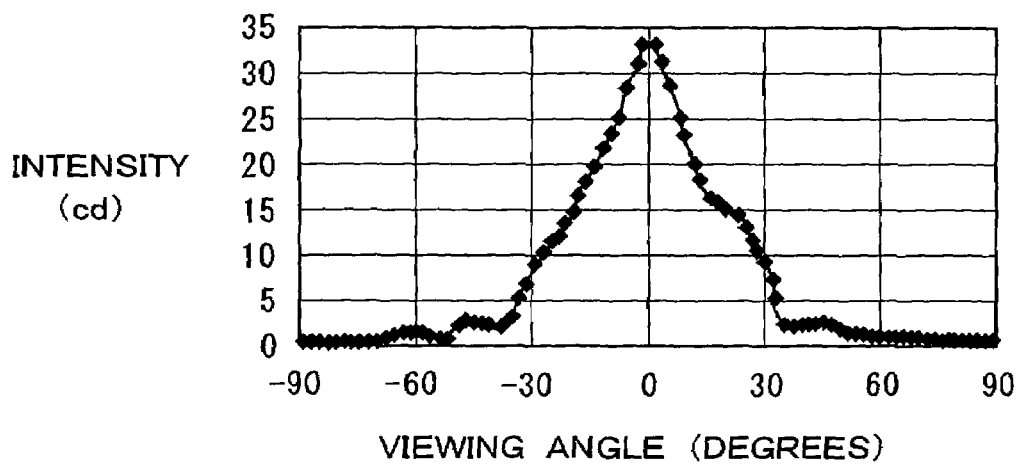
FIG. 13 is a graph showing the light intensity distribution of the Y-axis direction in the light intensity distribution shown in FIG. 11, wherein the horizontal axis represents the viewing angle in the Y-axis direction, and the vertical axis represents the light intensity.

The light intensity distribution when the light source was on will next be described. FIG. 9 is a polar coordinate diagram showing the light intensity distribution during emission from the optical waveguide when the light source was on, and the X direction and Y direction are shown in the drawing. FIG. 10 is a graph showing the light intensity distribution of the X-axis direction in the light intensity distribution shown in FIG. 9, wherein the viewing angle in the X-axis direction is plotted on the horizontal axis, and the light intensity is plotted on the vertical axis. FIG. 11 is a polar coordinate diagram showing the light intensity distribution during emission from the cone sheet when the light source was on, and the X direction and Y direction are shown in the drawing. FIG. 12 is a graph showing the light intensity distribution of the X-axis direction in the light intensity distribution shown in FIG. 11, wherein the viewing angle in the X-axis direction is plotted on the horizontal axis, and the light intensity is plotted on the vertical axis. FIG. 13 is a graph showing the light intensity distribution of the Y-axis direction in the light intensity distribution shown in FIG. 11, wherein the viewing angle in the Y-axis direction is plotted on the horizontal axis, and the light intensity is plotted on the vertical axis. In FIGS. 9 and 11, points having equal brightness are connected by solid lines, and the areas enclosed by the solid lines are designated as areas a, b, c, and d in order of brightness. Specifically, the brightest area was designated as area a, and the darkest area was designated as area d. The same applies in the other polar coordinate diagrams described hereinafter.

As shown in FIGS. 9 and 10, a peak in the light intensity distribution occurs in the direction tilted at −65 degrees in the X-axis direction from the Z-axis during emission from the optical waveguide. The tilt angle of the Y-axis direction is also distributed in relatively uniform fashion. As shown in FIGS. 11 through 13, the light intensity distribution during emission from the cone sheet is focused at 30 degrees or less in both the X-axis direction and the Y-axis direction. Specifically, it is apparent that the radiation range of the light source device is limited to a narrow range of angles, and the light is focused two-dimensionally when the light source is on.

As described above, in the light source unit 1, since only the optical waveguide 3 and the cone sheet 6 are disposed in the thickness direction, specifically, the Z-axis direction, the light source unit 1 can be made thinner. By the light focusing effects of the cone sheet 6, the range of radiation angles of the light emitted from the light source unit 1 can be reduced in both the X-axis direction and the Y-axis direction with respect to the emission direction, that is, the +Z direction. Specifically, the directivity of the emitted light can be increased in two dimensions.

The operation of the display device 2 of the present embodiment will next be described. A case of a wide-angle display will first be described. As shown in FIG. 1, the light having high directivity emitted from the light source unit 1 is incident on the louver 112. The portion of the light rays having a large angle in the Y direction is absorbed by the louver 112, and light having higher directivity in the Y direction is emitted. At this time, the light emitted from the display device 2 possesses adequately increased directivity in the Y direction as well. Therefore, the only light absorbed by the louver 112 is light that occurs due to scattering and the like by the light source device, and the quantity thereof is small. Specifically, reduction of luminous flux by the louver 112 is minimized.

As shown in FIG. 1, the light that has a distribution of high directivity and is emitted from the louver 112 enters the transparent/scattering state switching element 122. In the case of a wide-angle display, a voltage is not applied to the PDLC layer 111. The liquid crystal molecules 111b are therefore randomly dispersed in the polymer matrix 111a in the PDLC layer 111, and the incident light is scattered. Consequently, the high-directivity light is uniformly scattered by the PDLC layer 111 and dispersed in a wide range of angles. Specifically, the light whose directivity is increased by the louver 112 is scattered by the transparent/scattering state switching element 122, and becomes wide-angle light having decreased directivity. This light having a distribution that is spread over a wide range enters the transmissive liquid crystal panel 7, and is emitted without modification as wide-angle light, as shown in FIG. 1. An image is thus displayed in a wide viewing angle. As previously mentioned, the directivity of the light emitted from the light source device in the present invention is increased two-dimensionally with respect to the emitting surface, and the amount of light absorbed by the louver 112 is minimized. Therefore, the luminance during wide-angle display can be enhanced. Furthermore, since there is no need for the light source to be disposed as a point light source, and a plurality of light sources can be arranged on the light-incident surface of the optical waveguide, the intensity of the light source can be increased, and the luminance during wide-angle display thereby be enhanced even further.

A case of a narrow-angle display will next be described. The process until the light enters the transparent/scattering state switching element 122 is the same in the case of a narrow-angle display as it is in the case of a wide-angle display. In the case of a narrow-angle display, a prescribed voltage is applied to the PDLC layer 111. The PDLC layer 111 is thereby placed in a transparent state in which the liquid crystal molecules 111b dispersed in the polymer matrix 111a are oriented. Specifically, the incident light having high directivity is transmitted without modification. Specifically, the light whose directivity in the Y-axis direction is increased by the louver 112 is emitted from the transparent/scattering state switching element 122 in a state of distribution in which high directivity is maintained. This light having a distribution of high directivity enters the transmissive liquid crystal panel 7, and is emitted in its original state of high directivity, as shown in FIG. 1. An image is thus displayed in a narrow viewing angle.

The effects of the present embodiment will next be described. The light source device of the present embodiment provides high luminance since most of the light emitted from the light source in the light source unit can be emitted with high directivity in a certain range of angles with respect to the +Z direction as the central axis. As is apparent by comparing FIGS. 12 and 13 to FIGS. 39A and 39B, the directivity of the light source unit of the light source device of the present embodiment is higher than that of the conventional light source device, particularly in relation to the Y-axis direction. Therefore, light is radiated with high intensity by the light source device of the present embodiment, and the display luminance of the display device of the present embodiment is high.

In the light source device according to the present embodiment, it is sufficient if the light source is disposed along any one side of the optical waveguide. Therefore few limitations are placed on the mounting position of the light source, and a high degree of freedom is imparted to the design. For example, since there is no need to make the light source a point light source, and a plurality of point light sources or linear light sources can be provided, the luminance of the light source device as a whole can be enhanced. When the light source device according to the present embodiment is installed in a mobile terminal device, there is no need for the light source to be disposed to the left and right of the display screen, and the light source can be disposed above or below the display screen. The chassis of the mobile terminal device can therefore be miniaturized.

Furthermore, in the present embodiment, since the directivity of the light emitted from the light source unit is increased two-dimensionally in relation to the XY plane, the light source device can switch the range of radiation angles not only in the X-axis direction, but also in the Y-axis direction. The display device according to the present embodiment can therefore be endowed with the capability of switching between narrow-angle display and wide-angle display not only in the horizontal direction of the screen, but also in the vertical direction.

Furthermore, in the display device according to the present embodiment, the transparent areas and absorbent areas of the light-direction regulating element are arranged in alternating fashion along the Y-axis direction; specifically, the left-right direction of the screen. Therefore, the directivity in the Y-axis direction of the light emitted from the light source device can be enhanced even further by passing the light through the light-direction regulating element.

Furthermore, since the cones are arranged two-dimensionally on the cone sheet in the present embodiment, light that is incident in the direction angled 60 degrees to the +X direction from the +Z direction can be emitted by a single cone sheet in the direction angled 16.8 degrees to the +X direction fro the +Z direction, and the directivity of this light in the Y-axis direction can also be increased. There is therefore no need for providing a plurality of cone sheets, and the thickness of the light source device can be reduced.

The tilt angle of the tilted surface of the optical waveguide in the present invention is not limited by the aforementioned value, and another value may be selected insofar as the same effects are demonstrated. The material used for the optical waveguide is also not limited to the aforementioned material. Furthermore, the depth and pitch of the tilted surface are also not limited to the aforementioned values, and may differ within the optical waveguide. A range of tilt angles for the tilted surface may also be distributed within the optical waveguide. By increasing the pitch of the tilted surface near the light source in the optical waveguide, the luminance distribution can be made uniform in the light emitting plane of the light source device. Since it is also sufficient if the optical waveguide can emit light in a direction 60 degrees from the direction of the normal line of the emitting surface, an optical waveguide can be used in which a matte shape is printed on the emitting surface, as in the second conventional light source device. A wedge-shaped scattering-type optical waveguide may also be used, as in the third conventional light source device.

The apex angle, height, pitch, thickness, and other aspects of the cone sheet are also not limited by the aforementioned values, and different values may be selected insofar as the same effects are demonstrated. The material used for the cone sheet is also not limited by the aforementioned material. The apex points of the cones were also positioned so as to form an equilateral triangle, but this configuration is not limiting, and the apex points may form a shape other than an equilateral triangle. The side of the triangle is also not necessarily completely parallel to the Y-axis, and may be positioned at an angle with respect to the Y-axis in order to prevent moiré with the display panel. However, the phase of the positions of the cone apex points in the X-axis direction is preferably not uniform in relation to the Y-axis direction. By this configuration, the light emitted by the optical waveguide when the light source is on can be more efficiently focused in the Z-axis direction than when the phase in the X-axis direction is uniform in relation to the Y-axis direction. Furthermore, a diffusion pattern may be provided to the surface on the opposite side from the surface on which the cones are formed in the cone sheet. Moiré can thereby be prevented from occurring with the louver or the display panel.

Figure 14:
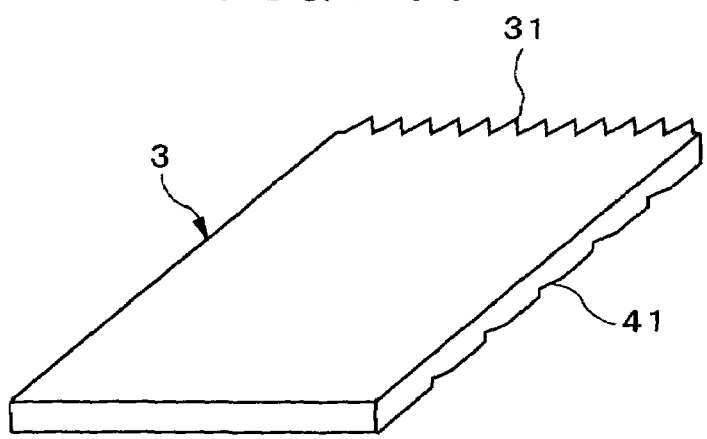
FIG. 14 is a perspective view showing the optical waveguide having a diffusion pattern provided to the light-incident surface.
Figure 15:
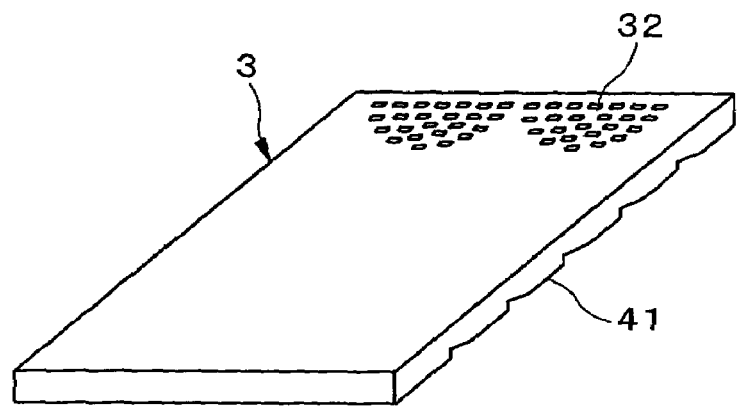
FIG. 15 is a perspective view showing the optical waveguide having a two-dimensional pattern provided to the light-exiting surface.

A cold cathode tube or other linear light source may also be used for the light source, and an LED or other point light source may also be used. The thickness of the light source can be reduced particularly when an LED is used, but providing a diffusion pattern 31 to the light-incident surface of the optical waveguide as shown in FIG. 14 is effective for making a point light source into a uniform linear light source. As shown in FIG. 15, a two-dimensional pattern 32 may be formed on the light-exiting surface 43 of the optical waveguide 3. The two-dimensional pattern 32 is composed, for example, of a plurality of depressions distributed in a semicircular area. The two-dimensional pattern 32 is particularly effective for making the light from the light source uniform when placed near the light source. As previously mentioned, a plurality of LED may be disposed on the light-incident surface of the optical waveguide.

The intensity of the light source may be adjusted so that the frontal luminance of the transmissive liquid crystal panel has the same value during narrow-angle display and wide-angle display. The frontal luminance of the transmissive liquid crystal display panel can thereby be maintained constant, and discomfort during switching between narrow-angle display and wide-angle display can be reduced. When the light source is composed of a white LED, and the white LED is composed of a blue LED and a yellow phosphor, the intensity of the white LED may be adjusted by pulse width modulation of the current. In a white LED composed of a blue LED and a yellow phosphor, the yellow phosphor is excited by a portion of the blue light emitted by the blue LED, and yellow light is emitted. The blue light and the yellow light mix together to generate white light. The emission ratio of the blue light and yellow light fluctuates when the amount of current is adjusted so that the frontal luminance of the transmissive liquid crystal panel in the case of narrow-angle display has the same value as in the case of wide-angle display. Variation therefore occurs in the chroma of the transmissive liquid crystal panel. In contrast, when the light intensity is adjusted by pulse modulation, adjustment of the light intensity is achieved by adjusting the ratio of the emission time, allowing variation in the chroma of the transmissive liquid crystal panel to be minimized.

The display panel used in the present invention is not limited to a liquid crystal panel, and any display panel that uses a light source device may be used. The liquid crystal panel is also not limited to the transmissive type, and any panel that has a transmissive area in each pixel may be used. A transflective liquid crystal panel having a reflective area in a portion of each pixel, a visible-everywhere transflective liquid crystal panel, or a micro-reflective liquid crystal panel may also be used. A liquid crystal panel is suitable that has minimal dependence on viewing angle, and that is capable of suppressing contrast inversion during display at a wide viewing angle. Examples of the mode of such a liquid crystal panel include IPS (In-Plane Switching), FFS (Fringe Field Switching), AFFS (Advanced Fringe Field Switching), and the like among horizontal field modes. Vertical alignment modes include MVA (multi-domain vertical Alignment), which is multi-domain and possesses reduced viewing-angle dependency, PVA (Patterned Vertical Alignment), ASV (Advanced Super V), and the like. Furthermore, a film-compensated TN mode liquid crystal display panel may also be appropriately used.

The transparent/scattering state switching element used in combination with the light source device of the present invention is not limited to having a PDLC layer, and any element capable of switching between a transparent state and a scattering state may be appropriately used. Examples thereof may include an element that uses a polymer network liquid crystal (PNLC), or an element that uses dynamic scattering (DS). In the aforementioned PDLC layer, a transparent/scattering state switching element is used that is in the scattering state when a voltage is not applied, and in the transparent state when a voltage is applied. By this configuration, the brightness of the light source device during the scattering state can be enhanced since the transparent/scattering state element consumes no power when in the state where incident light is scattered, and the power that would have been consumed is allocated to the backlight light source. It is also possible to use a PDLC layer that is in the transparent state when a voltage is not being applied, and in the scattering state when a voltage is applied. This type of PDLC layer is obtained by exposing a mixture of a photocuring resin and a liquid crystal material to light and curing the mixture while applying a voltage. By this configuration, there is no need for applying a voltage to the PDLC layer, and power consumption can be suppressed in a mobile information terminal device in which narrow-angle display is frequently used. Cholesteric liquid crystal, ferroelectric liquid crystal, or the like may also be used as the liquid crystal molecules used in the PDLC layer. Even when voltage is no longer applied, these liquid crystals retain the orientation they had when the voltage was applied, and have memory properties. By using this type of PDLC layer, it becomes possible to reduce power consumption.

The louver in the present embodiment was described as having transparent areas and absorbent areas arranged in alternating fashion in the Y direction, but a rotating arrangement in the XY plane may also be adopted. By this configuration, the moiré created by the louver and the display panel can be made less noticeable, and the display quality can be enhanced. By setting the direction in which the transparent areas and absorbent areas are alternately arranged to a different direction from the direction in which the cones of the cone sheet are arranged, the moiré created by the louver and the cone sheet can be made less noticeable, and the display quality can be enhanced.

The distal ends of the cones in the cone sheet used in the light source device of the present invention may be rounded to an extent that does not significantly diminish the two-dimensional light-focusing effects. The shape thereof is not limited to a cone, and another shape may be applied in the same manner insofar as a fine two-dimensional pattern is arranged in repeating fashion, and the shape has two-dimensional light-focusing effects.

The display device of the present embodiment may be suitably installed in a mobile telephone or other mobile terminal device. Compatible mobile terminal devices include not only mobile telephones, but also PDAs, gaming devices, digital cameras, digital video cameras, and various other types of mobile terminal devices. The display device may be installed not only in mobile terminal devices, but also in video players, notebook-type personal computers, cash dispensers, vending machines, and other various types of terminal devices.

Figure 16:
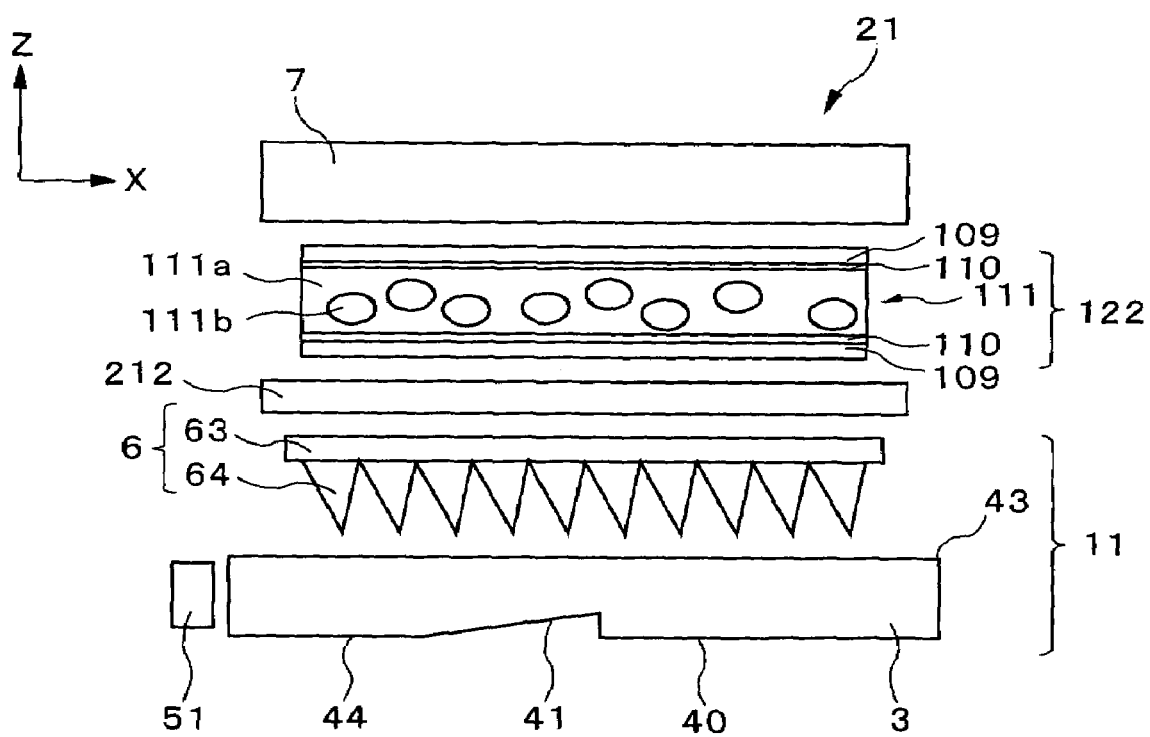
FIG. 16 is a sectional view showing the display device according to a second embodiment of the present invention.
Figure 17:
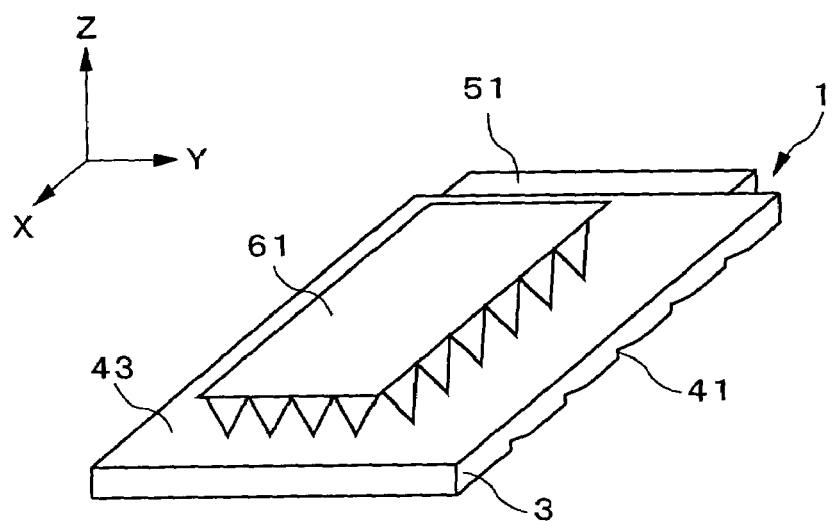
FIG. 17 is a perspective view showing the light source unit of the light source device according to the second embodiment of the present invention.
Figure 18:
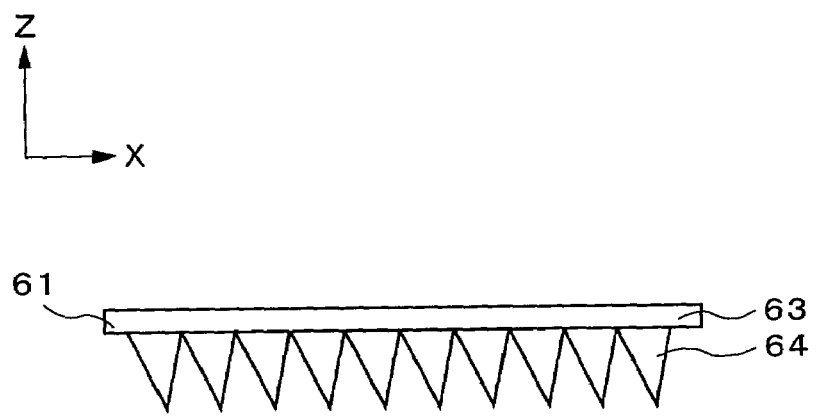
FIG. 18 is a sectional view in the XZ plane of the cone sheet used in the light source device according to the second embodiment of the present invention.
Figure 19:
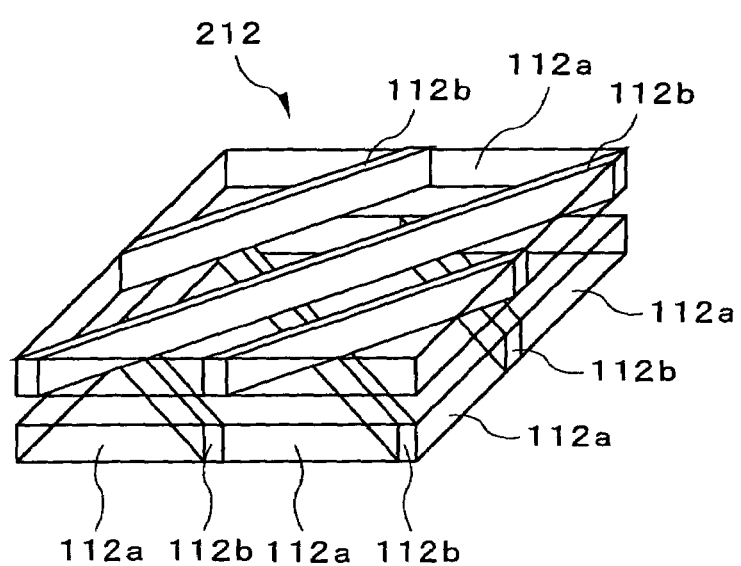
FIG. 19 is a perspective view showing the louver used in the display device according to the second embodiment of the present invention.

The light source device, display device, terminal device, and optical member according to a second embodiment of the present invention will next be described. FIG. 16 is a sectional view showing the display device of the present embodiment; FIG. 17 is a perspective view showing the light source unit of the light source device of the present embodiment; FIG. 18 is a sectional view in the XZ plane of the cone sheet used in the light source device of the present embodiment; and FIG. 19 is a perspective view showing the louver of the present embodiment. As shown in FIGS. 17 and 18, the light source unit 11 of the present embodiment is provided with the cone sheet 61 instead of the cone sheet 6 in the light source unit 1 (see FIG. 1) of the previously described first embodiment. In the cone sheet 61, the central axes of the cones 64 are tilted 10 degrees towards the +X direction from the −Z direction.

The louver 212 is also provided in the display device 21 of the present embodiment instead of the louver 112 (see FIG. 1) in the previously described first embodiment. As shown in FIG. 19, the louver 212 of the present embodiment is composed of two combined layers of the louver 112 according to the previously described first embodiment. In each louver 112, belt-shaped transparent areas 112a and absorbent areas 112b extending in one direction are arranged in alternating fashion. The direction in which the transparent areas 112a and absorbent areas 112b are arranged in the louver 112 constituting the bottom layer of the louver 212 is orthogonal to the arrangement direction of the same in the louver 112 constituting the top layer of the louver 212. The abovementioned two arrangement directions orthogonal to each other both lie in the XY plane, and are tilted 45 degrees, for example, with respect to the +X direction. Other aspects of the present embodiment are the same as those of the aforementioned first embodiment.

Figure 20:
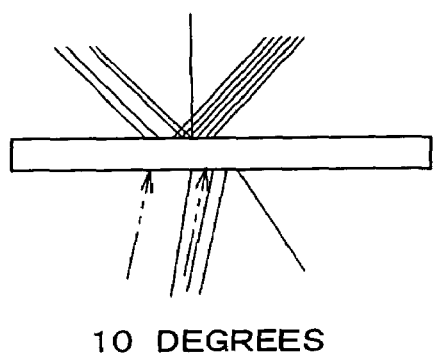
FIGS. 20A through 20G show the results of simulating the emitted light when the direction of light rays incident on the cone sheet is changed, in order to show the optical operation of the cone sheet provided with circular cones having a tilt angle of 10 degrees; wherein FIGS. 20A, B, C, D, E, F, and G show the results when the incidence angle is changed 10 degrees, 20 degrees, 30 degrees, 40 degrees, 50 degrees, 60 degrees, and 70 degrees from the Z-axis, respectively.
Figure 20:
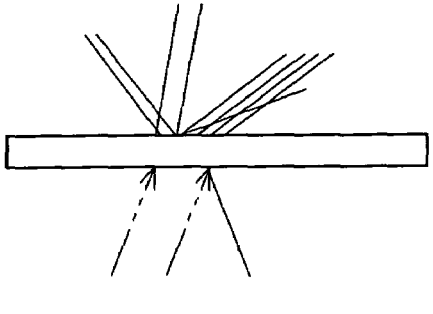
Figure 20:
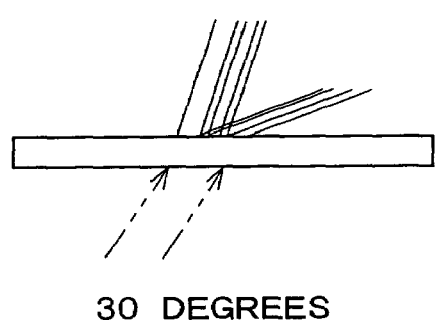
Figure 20:
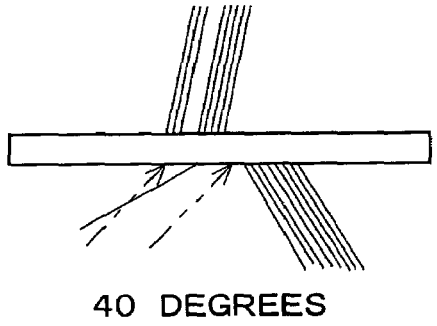
Figure 20:
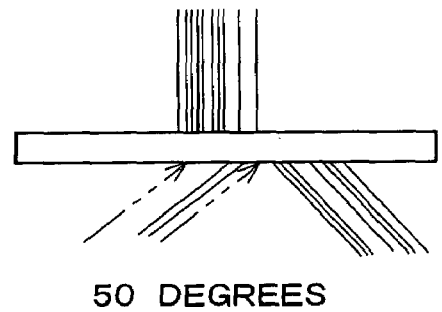
Figure 20:
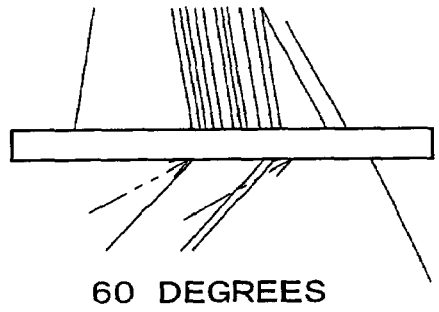
Figure 20:
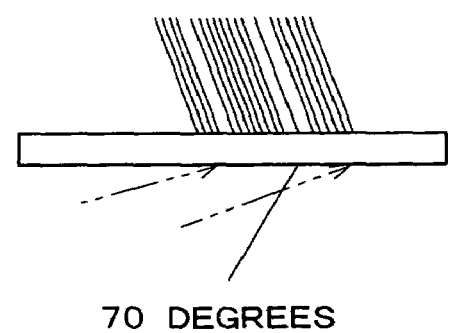

The operation of the display device 21 of the present embodiment thus configured will next be described, but the operation of the light source unit 11 will be described first. In the present embodiment, the operation until the light emitted from the light source 51 is emitted from the optical waveguide 3 is the same as in the first embodiment. The operation of the cone sheet 61 in the present embodiment differs from the first embodiment. Therefore, attention will be given to the operation of the cone sheet 61 having tilted cones. FIGS. 20A through 20G show the results of simulating the emitted light when the direction of light rays incident on the cone sheet is changed, in order to show the optical operation of the cone sheet 61 that has tilted cones and is used in the present embodiment; wherein FIGS. 20A, B, C, D, E, F, and G show the results when the incidence angle is changed 10 degrees, 20 degrees, 30 degrees, 40 degrees, 50 degrees, 60 degrees, and 70 degrees from the Z-axis, respectively. In FIG. 20, the two double-dashed lines with arrows indicate the outer edges of the incident luminous flux, and solid lines without arrows indicate the emitted light rays.

It is apparent from FIGS. 20A through 20G that when the incidence angle of the incident light is changed, the emitted light proceeds in various directions, but that light rays in particular having incidence angles 60 degrees and 70 degrees from the Z-axis are deflected in the frontal direction.

Figure 21:
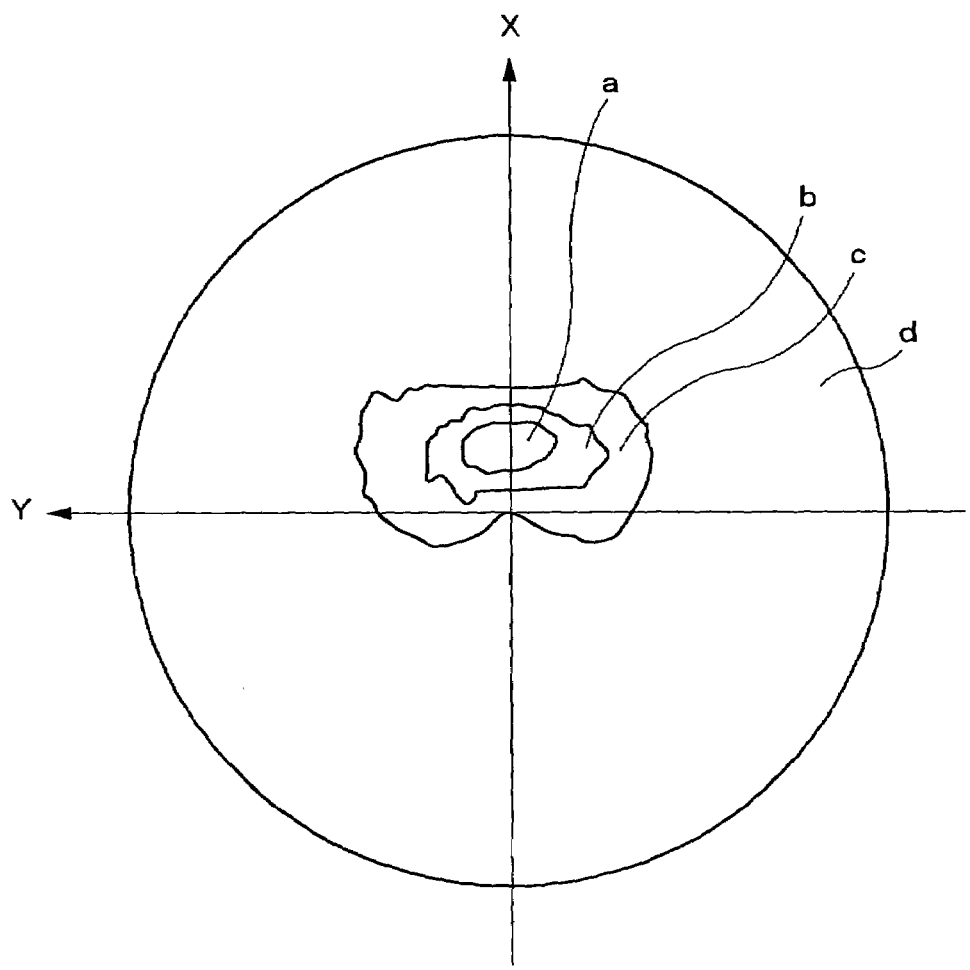
FIG. 21 is a diagram showing the simulation results when the light source is on in the second embodiment of the present invention, and particularly shows the intensity distribution of the light when emitted from the cone sheet.
Figure 22:
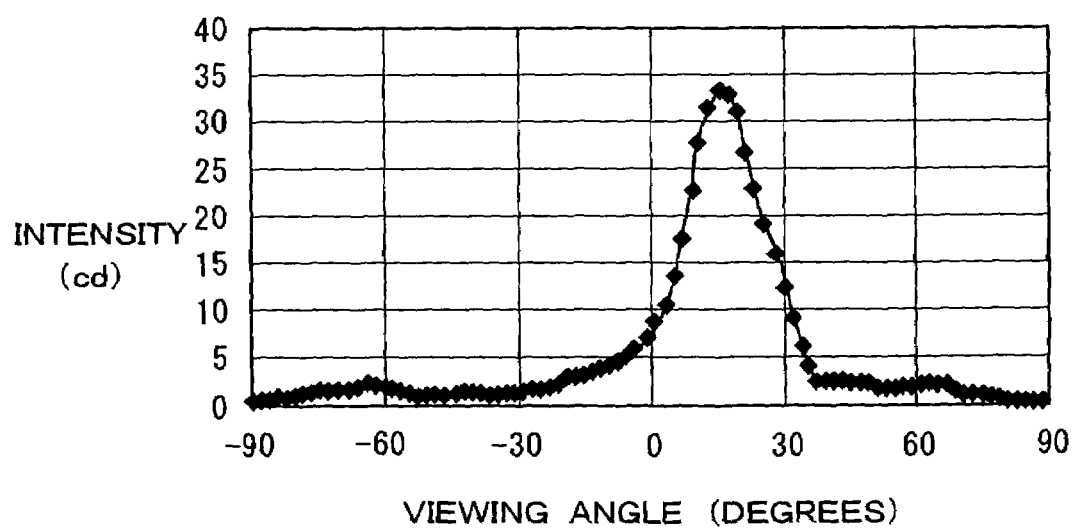
FIG. 22 is a graph showing the light intensity distribution of the X-axis direction in the light intensity distribution shown in FIG. 21, wherein the horizontal axis represents the viewing angle in the X-axis direction, and the vertical axis represents the light intensity.
Figure 23:
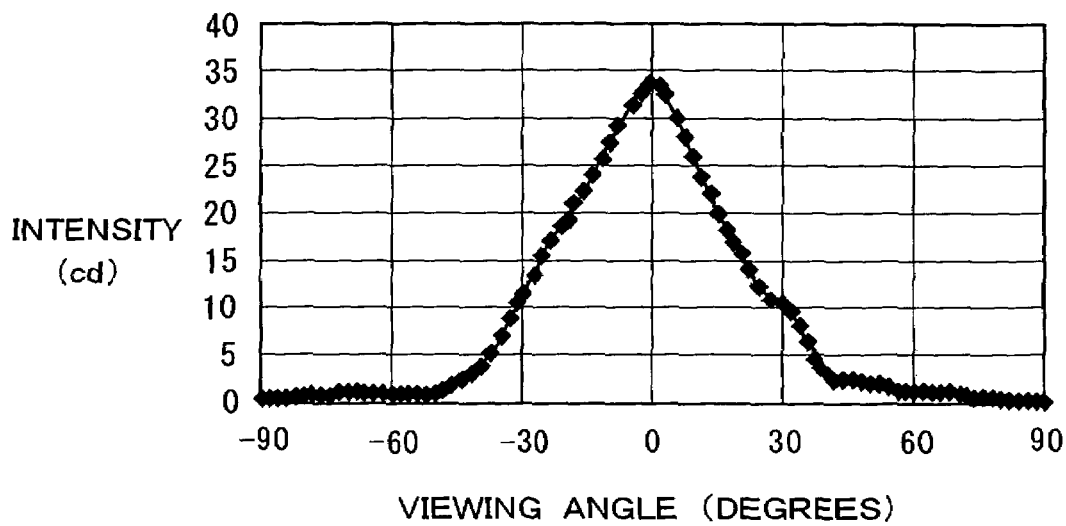
FIG. 23 is a graph showing the light intensity distribution of the Y-axis direction in the light intensity distribution shown in FIG. 21, wherein the horizontal axis represents the viewing angle in the Y-axis direction, and the vertical axis represents the light intensity.

A computer simulation was performed in the same manner as in the first embodiment by using a commercially available ray tracing simulator in order to perform a detailed investigation of the abovementioned design. The optical model was the same as in the first embodiment, except that the cones were tilted 10 degrees in the +X direction. FIG. 21 is a polar coordinate diagram showing the intensity distribution of the light during emission from the cone sheet when the light source was on, wherein the X direction and Y direction are shown. FIG. 22 is a graph showing the light intensity distribution of the X-axis direction in the light intensity distribution shown in FIG. 21, wherein the horizontal axis represents the viewing angle in the X-axis direction, and the vertical axis represents the light intensity. FIG. 23 is a graph showing the light intensity distribution of the Y-axis direction in the light intensity distribution shown in FIG. 21, wherein the horizontal axis represents the viewing angle in the Y-axis direction, and the vertical axis represents the light intensity. As shown in FIGS. 21 through 23, the light intensity distribution during emission from the cone sheet is focused within 30 degrees in both the X-axis direction and the Y-axis direction, and the center in particular can be caused to approach the front. The tilt angle of the cones is not limited to 10 degrees, and a different value may be selected insofar as the same effects are demonstrated.

The operation of the display device 21 of the present embodiment will next be described. Light with high directivity emitted in the frontal direction from the light source unit 11 enters the louver 212. The louver 212 absorbs not only light rays that have a large angle in the Y direction, but also light rays whose incidence direction with respect to the light-incident surface of the louver 212 is tilted at a large angle from the direction of the normal line of the light-incident surface, and light that possesses further increased directivity in two dimensions is emitted. Since the light emitted from the light source unit 11 at this time possesses adequately increased directivity in two dimensions, the only light absorbed by the louver 212 is the minute quantity of light that occurs due to scattering and the like by the light source device. Specifically, reduction of luminous flux by the louver 112 is minimized. The light that has a distribution of high directivity and is emitted from the louver 212 enters the transparent/scattering state switching element 122, and the subsequent operation is the same as in the previously described first embodiment.

In the second embodiment thus configured, the louver is composed of two layers, and the arrangement directions of the transparent areas and absorbent areas in each layer are arranged orthogonally to each other. Therefore, the directivity of the light emitted from the light source unit 11 can be increased in relation to both the X-axis direction and the Y-axis direction. Specifically, the directivity of the light can be increased in two dimensions. As a result, the light emitted from the display screen when the transparent/scattering state switching element 122 is placed in the transparent state possesses increased directivity not only in the horizontal direction of the display screen, but in the vertical direction as well. When the transparent/scattering state switching element 122 is placed in the scattering state, the angle of the light emitted from the display screen is two-dimensionally widened in both the horizontal direction and the vertical direction of the display screen. Therefore, in the display device of the present embodiment, the viewing angle can be changed in two dimensions with respect to the display screen. Since the light rays emitted from the light source device at this time possess increased directivity in two dimensions in the frontal direction, loss of light by the louver is kept to an absolute minimum, and the luminance during wide-angle display can be significantly enhanced.

As in the present embodiment, when a louver having two orthogonally arranged layers is used, it is especially important to use a light source device that emits light in the frontal direction with high directivity in two dimensions. This is because the amount of luminous flux absorbed by the louver increases, and the efficiency of light usage declines when the direction of the light emitted from the light source device deviates from the frontal direction (+Z direction). The effects of the present embodiment other than those described above are the same as in the previously described first embodiment.

Figure 24:
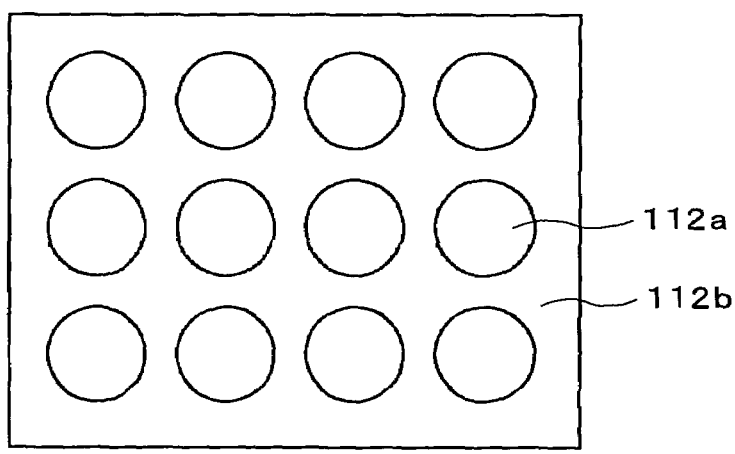
FIG. 24 is a plan view showing the louver used in the display device according to the second embodiment of the present invention.
Figure 25:
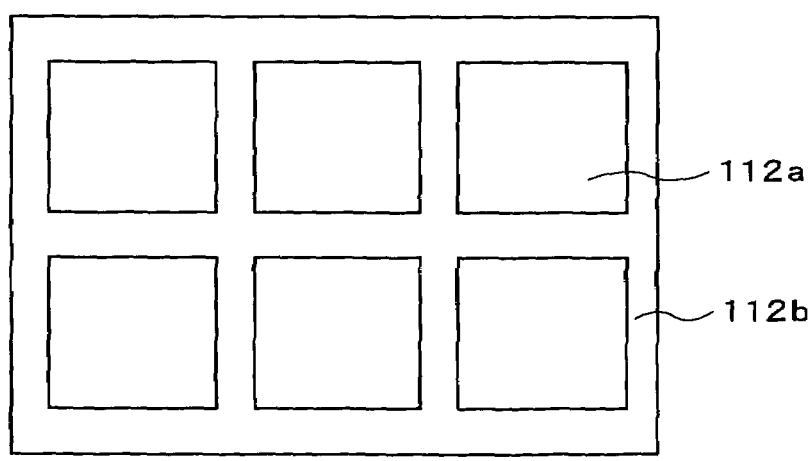
FIG. 25 is a plan view showing the louver used in the display device according to the second embodiment of the present invention.

The louver used in the present embodiment has two orthogonally arranged layers, but the angle of intersection; specifically, the angle formed by the directions in which the transparent areas and absorbent areas are arranged with respect to each other in the top layer and bottom layer, is not limited to a right angle, and a different angle may be set as needed. However, the most isotropic directivity in the X-Y plane can be achieved using an orthogonal arrangement. The louver was also formed from two layers, but a louver may also be used in which circular transparent areas 112a are arranged in a matrix in an absorbent area 112b, as shown in FIG. 24. A louver may also be used in which square transparent areas 112a are arranged in a matrix in an absorbent area 112b, as shown in FIG. 25. By this configuration, the directivity can be increased in two dimensions by one layer, allowing a thinner display device to be obtained in comparison to a case in which two louver layers are used. The direction in which the transparent areas are arranged in a matrix may be set to a different angle with respect to the X-Y axis. Moiré generated by interaction with the display panel can thereby be reduced. The shape of the transparent areas as viewed from the incidence direction of the light may be a shape other than rectangular or circular, and may be elliptical or rectangular, for example.

Figure 26:
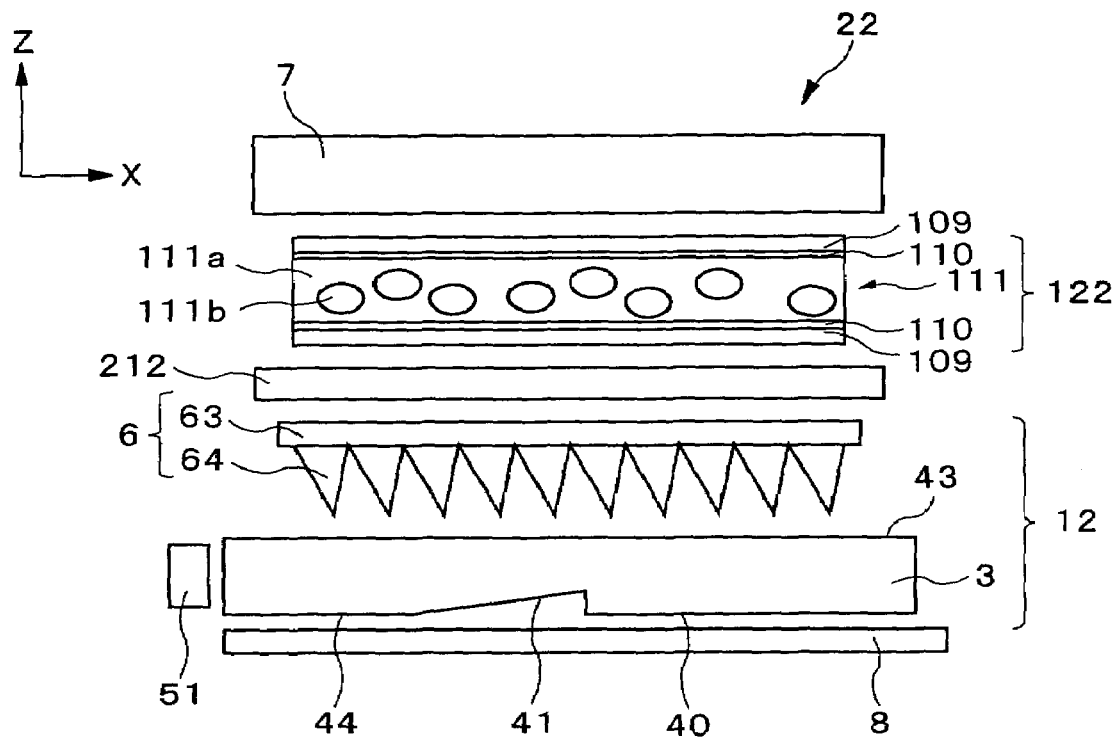
FIG. 26 is a sectional view showing the display device according to a third embodiment of the present invention.
Figure 27:
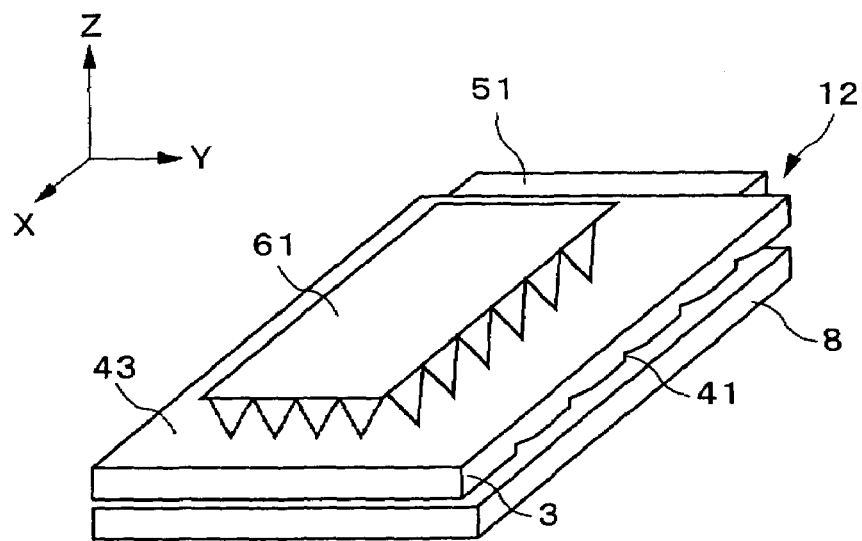
FIG. 27 is a perspective view showing the light source unit of the light source device according to the third embodiment of the present invention.

The light source device, display device, terminal device, and optical member according to a third embodiment of the present invention will next be described. FIG. 26 is a sectional view showing the display device of the present embodiment; and FIG. 27 is a perspective view showing the light source unit of the light source device of the present embodiment. As shown in FIG. 27, in the light source unit 12 of the present embodiment, a reflecting panel 8 is mounted so as to face the light-diffusing surface 44 of the optical waveguide 3 in the −Z direction as viewed from the optical waveguide 3. The reflecting panel 8 reflects towards the optical waveguide 3 the light emitted from the light-diffusing surface 44 of the optical waveguide 3 due to scattering and other causes. Aspects of the configuration in the present embodiment other than those described above are the same as in the previously described second embodiment.

Figure 28:
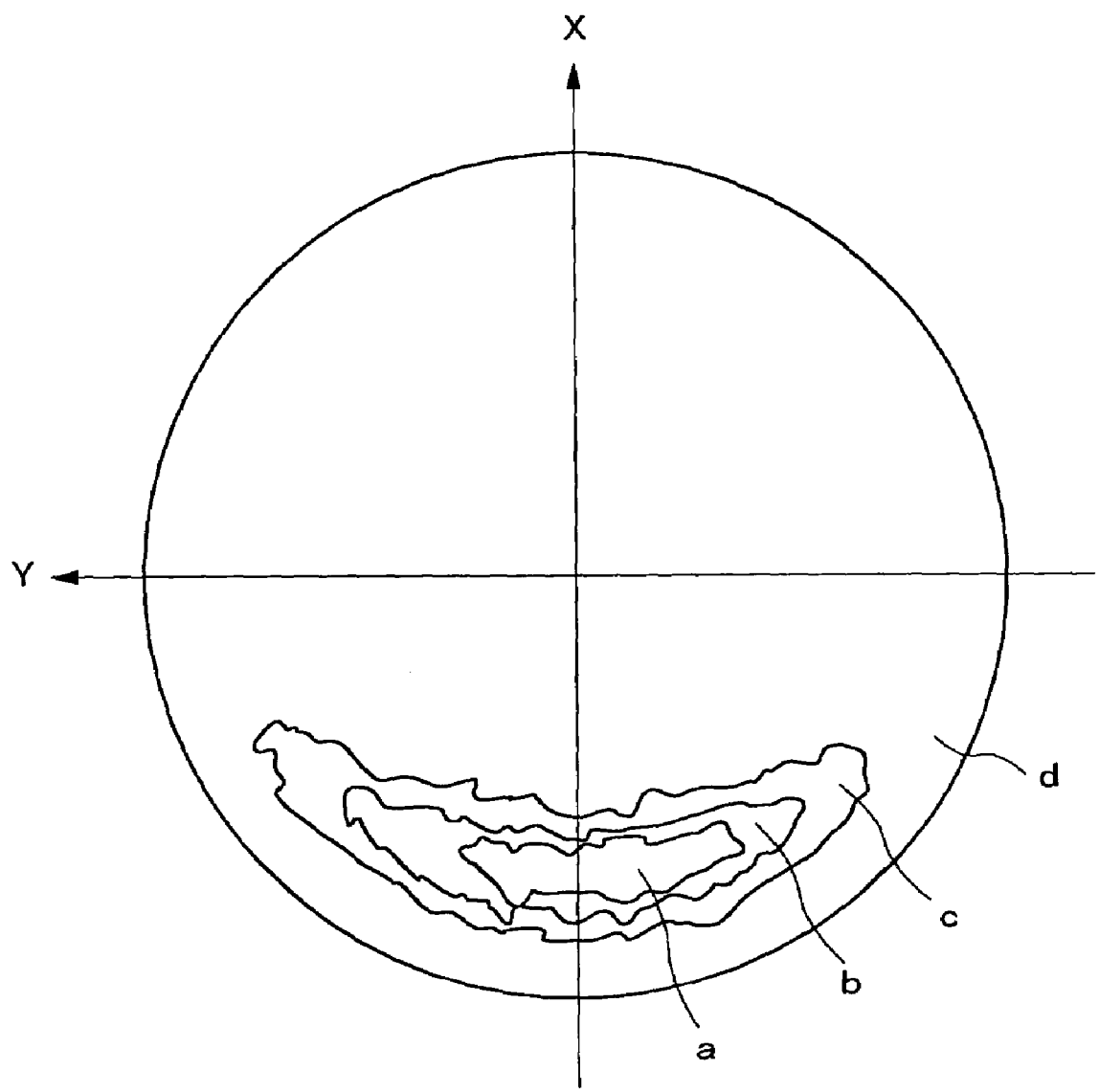
FIG. 28 is a diagram showing the simulation results when the light source is on in the third embodiment of the present invention, and particularly shows the intensity distribution of the light when emitted from the optical waveguide.
Figure 29:
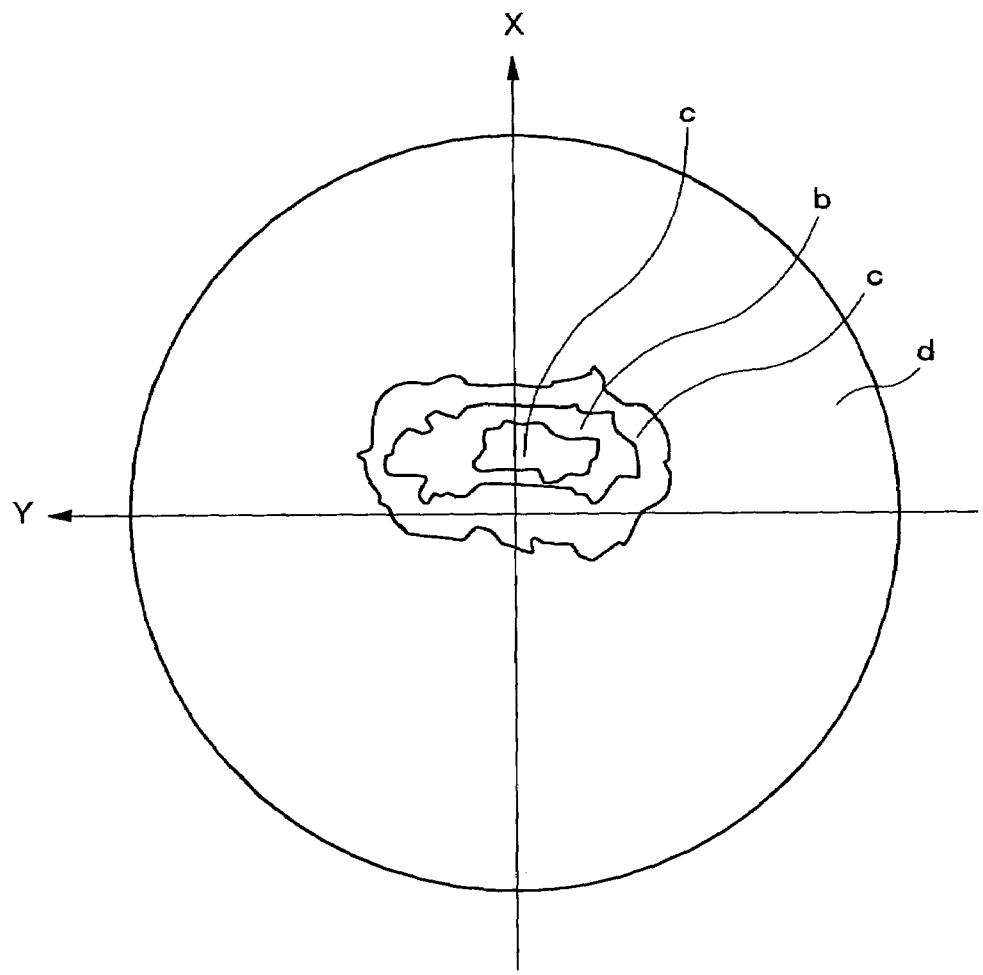
FIG. 29 is a diagram showing the simulation results when the light source is on in the third embodiment of the present invention, and particularly shows the intensity distribution of the light when emitted from the cone sheet.
Figure 30:
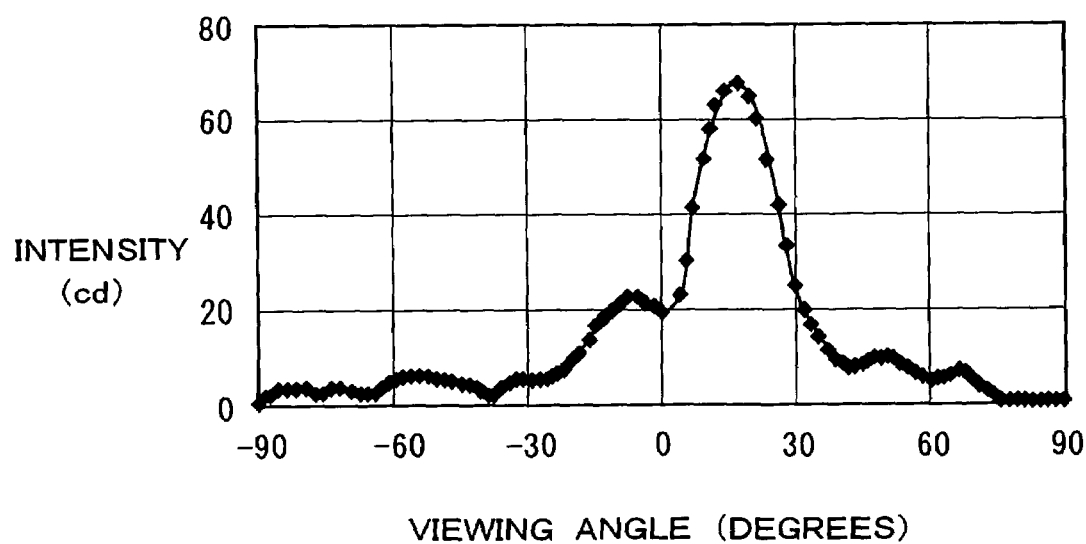
FIG. 30 is a graph showing the light intensity distribution of the X-axis direction in the light intensity distribution during cone sheet emission shown in FIG. 29, wherein the horizontal axis represents the viewing angle in the X-axis direction, and the vertical axis represents the light intensity.
Figure 31:
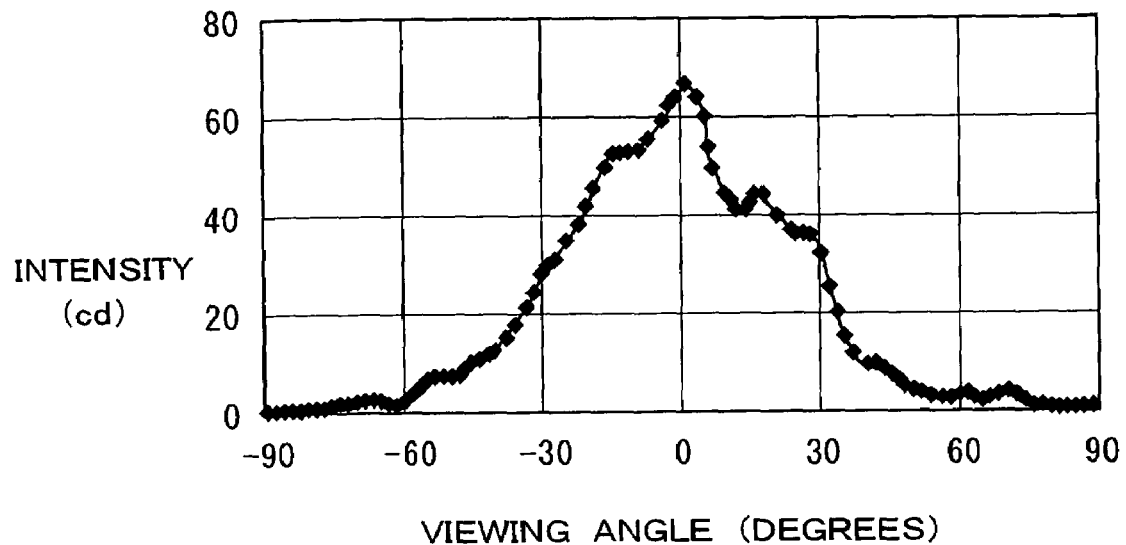
FIG. 31 is a graph showing the light intensity distribution of the X-axis direction in the light intensity distribution during cone sheet emission shown in FIG. 29, wherein the horizontal axis represents the viewing angle in the Y-axis direction, and the vertical axis represents the light intensity.

A computer simulation was performed in the same manner as in the first embodiment using a commercially available ray tracing simulator in order to investigate the validity of the abovementioned design. The optical model was the same as in the first embodiment, except that the reflecting panel 8 was mounted towards the −Z direction of the optical waveguide 3. FIGS. 28 and 29 are polar coordinate diagrams showing the intensity distribution of the light during emission from the optical waveguide and the cone sheet, respectively, when the light source is on, wherein the X direction and Y direction are shown. FIG. 30 is a graph showing the luminance distribution of the X-axis direction in the light intensity distribution during cone sheet emission shown in FIG. 29, wherein the horizontal axis represents the viewing angle in the X-axis direction, and the vertical axis represents the light intensity. FIG. 31 is a graph showing the luminance distribution of the Y-axis direction in the light intensity distribution during cone sheet emission shown in FIG. 29, wherein the horizontal axis represents the viewing angle in the Y-axis direction, and the vertical axis represents the light intensity.

As shown in FIG. 28, a peak in the light intensity distribution occurs in the direction tilted at 65 degrees from the Z-axis during emission from the optical waveguide, and there is no decrease in directivity relative to the first embodiment of the present invention. As shown in FIGS. 30 and 31, the light intensity distribution during emission from the cone sheet is focused within 30 degrees in both the X-axis direction and the Y-axis direction, and the intensity is increased in comparison to the first embodiment of the present invention, in which the reflecting panel was not provided. Specifically, the light from the light source can be utilized more effectively without compromising directivity. By this configuration, loss of light by the louver can be kept to an absolute minimum, and the luminance during wide-angle display can be significantly enhanced. The same luminance-enhancing effects can also be obtained when the one-dimensional louver described in the first embodiment of the present invention is applied. The effects of the present embodiment other than those described above are the same as in the previously described second embodiment.

Figure 32:
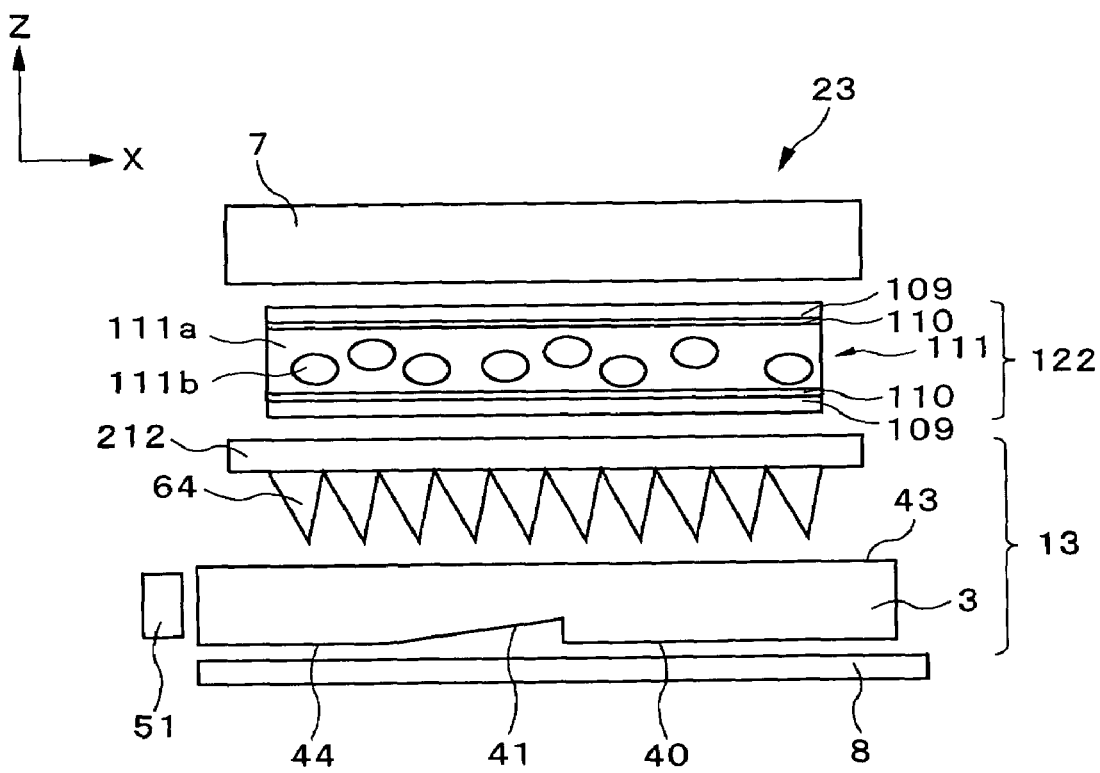
FIG. 32 is a sectional view showing the display device according to a fourth embodiment of the present invention.

The light source device, display device, terminal device, and optical member according to a fourth embodiment of the present invention will next be described. FIG. 32 is a sectional view showing the display device of the present embodiment. As shown in FIG. 32, in the display device 23 of the present embodiment, cones 64 are formed directly on the louver 212 in the light source unit 13. Specifically, the louver and the cone sheet are integrally formed. Aspects of the configuration in the present embodiment other than those described above are the same as in the previously described third embodiment.

In the fourth embodiment thus configured, not only is the luminance during wide-angle display significantly enhanced in the same manner as by the display device of the third embodiment, but having the cones formed directly on the louver makes it possible to reduce the thickness of the light source device, the display device, and the terminal device. Interference fringing that occurs when the cone sheet and the louver are arranged in proximity to each other can also be prevented. Other effects of the present embodiment are the same as in the previously described third embodiment.

Figure 33:
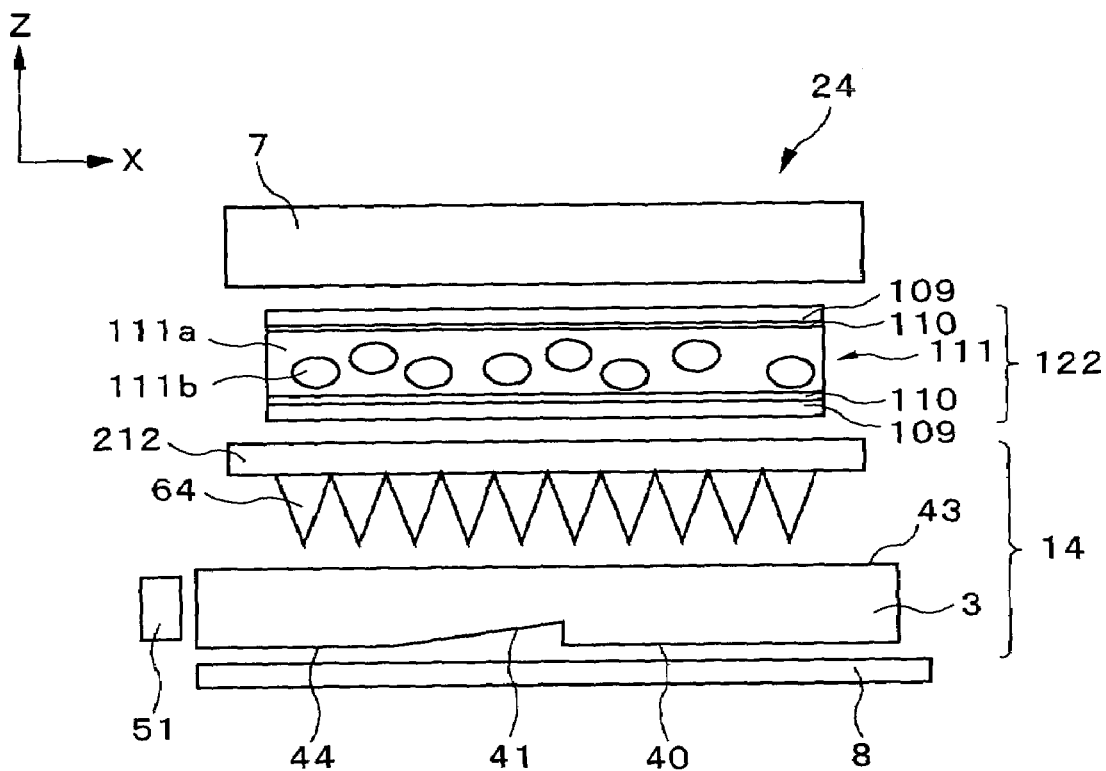
FIG. 33 is a sectional view showing the display device according to a fifth embodiment of the present invention.
Figure 34:
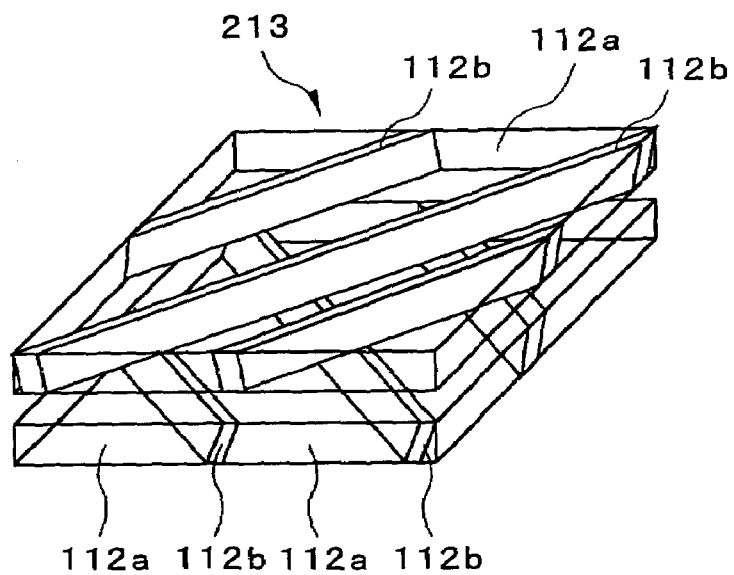
FIG. 34 is a perspective view showing the louver used in the display device according to the fifth embodiment of the present invention.
Figure 35:
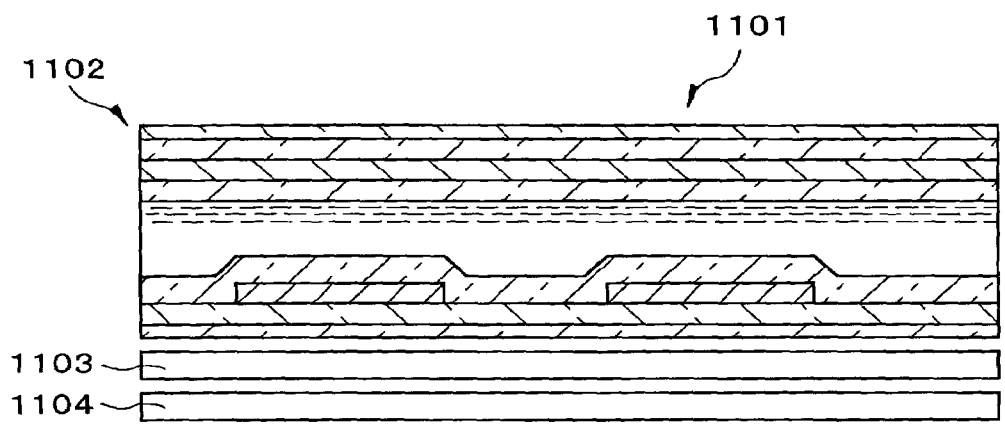
FIG. 35 is a schematic sectional view showing the conventional viewing-angle-controlled liquid crystal display device described in Japanese Laid-Open Patent Application 9-244018.
Figure 36:
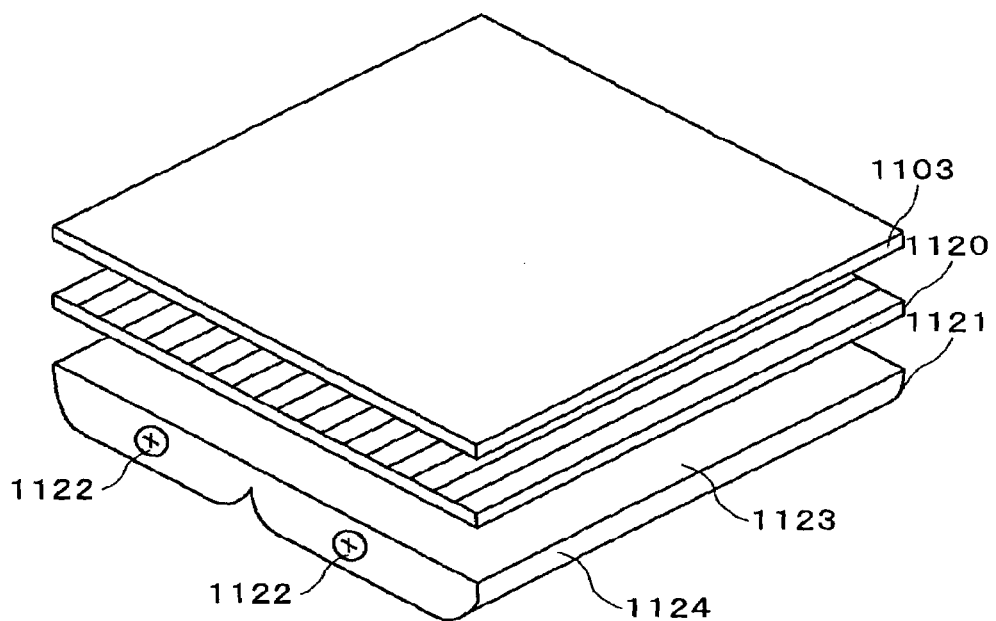
FIG. 36 is a schematic sectional view showing the illumination device used in the conventional viewing-angle-controlled liquid crystal display device described in Japanese Laid-Open Patent Application 9-244018.
Figure 37:
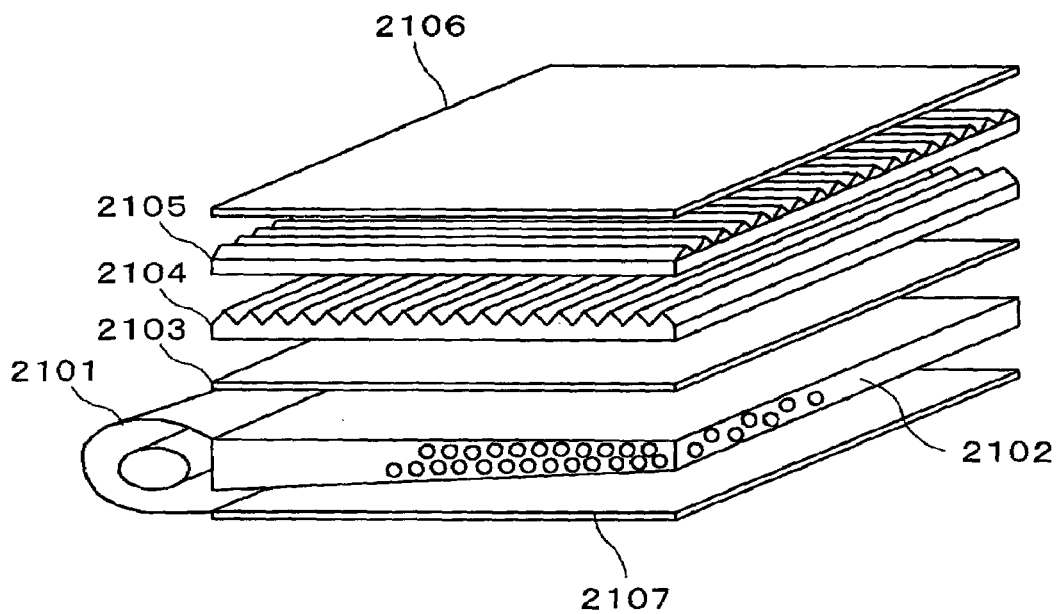
FIG. 37 is a perspective view showing the first conventional high-directivity light source device described on pages 14 through 21 of the April 2004 issue of *Monthly Display*.
Figure 38:
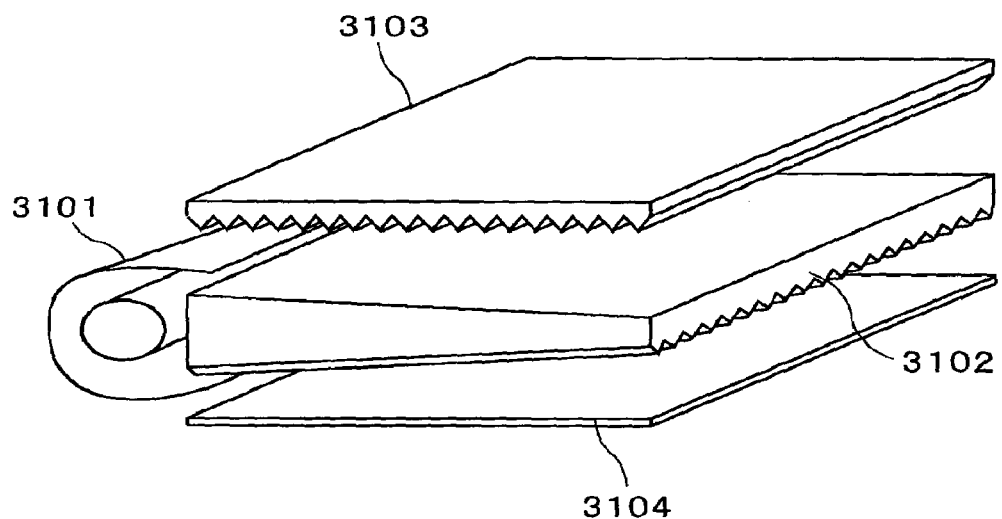
FIG. 38 is a perspective view showing the second conventional high-directivity light source device described on pages 14 through 21 of the April 2004 issue of *Monthly Display*.
Figure 39:
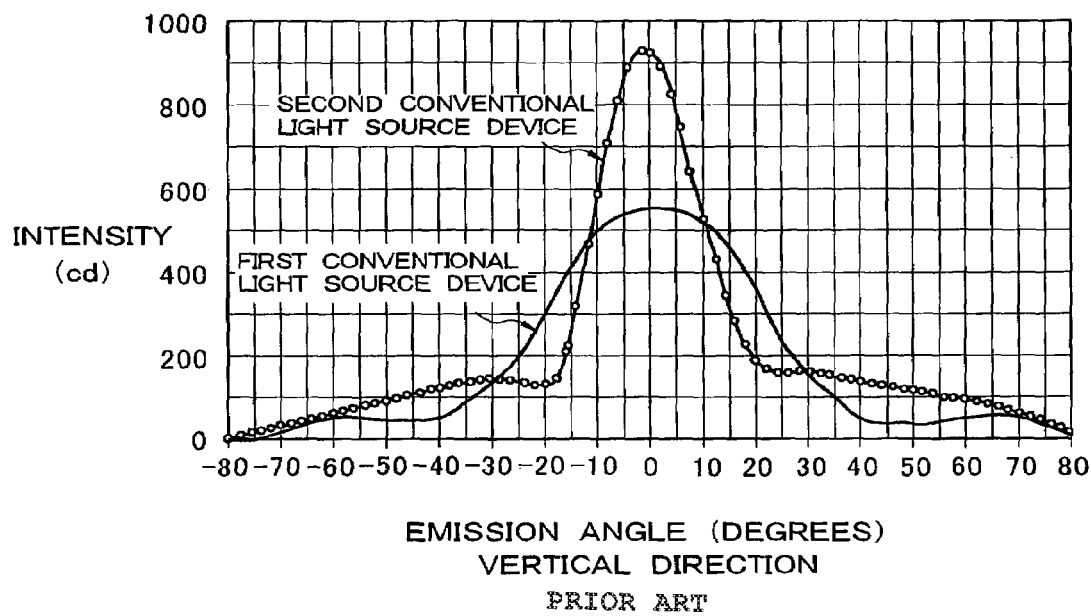
FIGS. 39A and 39B are graphs showing the results of comparing the directivity characteristics of the second conventional high-directivity light source device with the directivity characteristics of the first conventional high-directivity light source device, wherein the horizontal axis represents the exit angle, and the vertical axis represents the light intensity.
Figure 39:
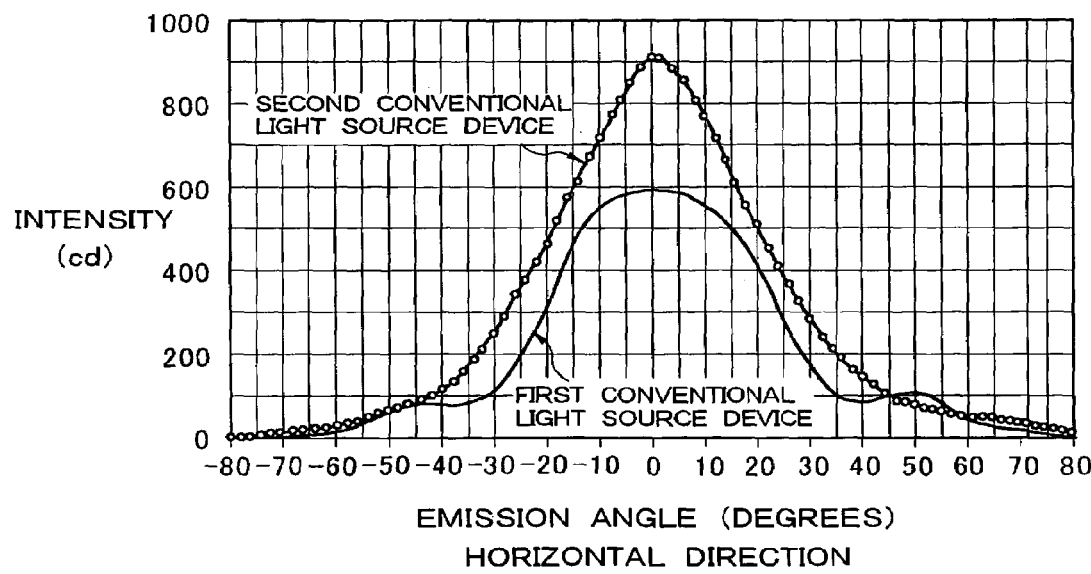
Figure 40:
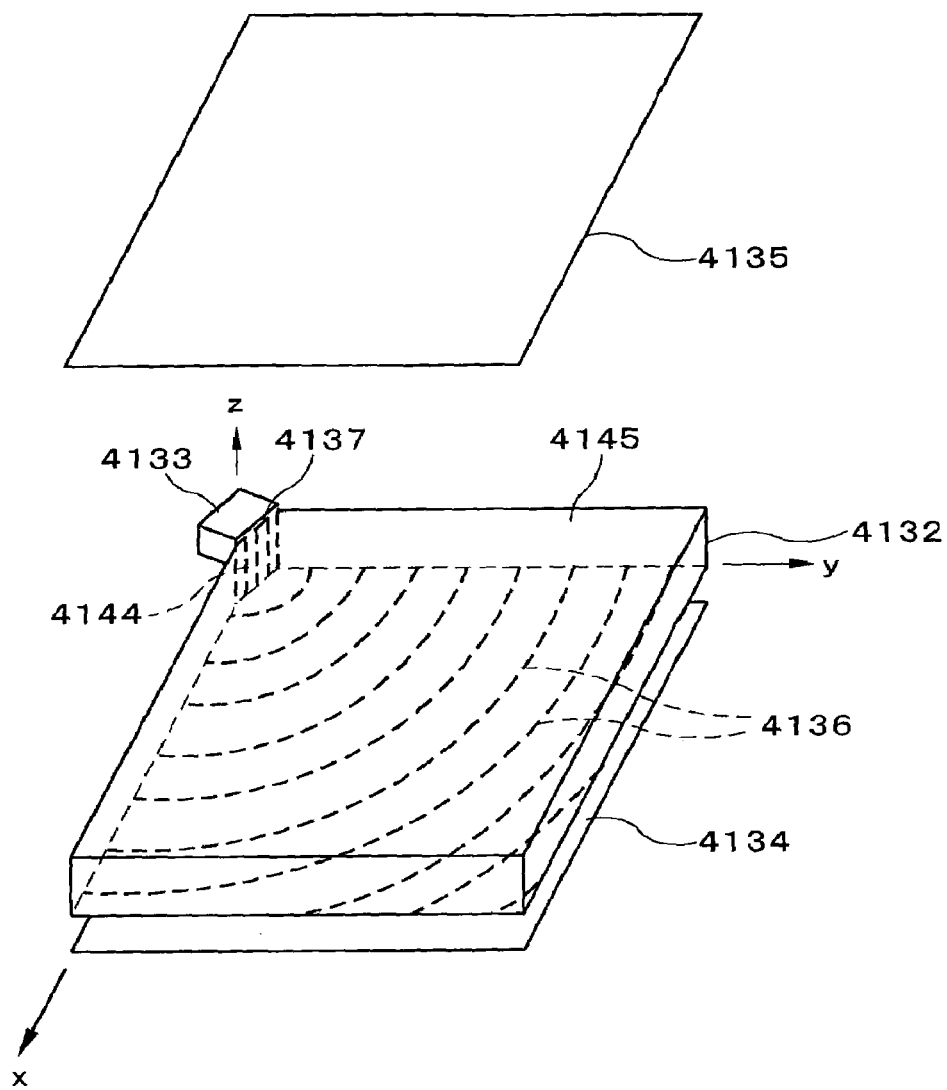
FIG. 40 is a perspective view showing the third conventional high-directivity light source device described in Japanese Laid-Open Patent Application 2003-215584.
Figure 41:
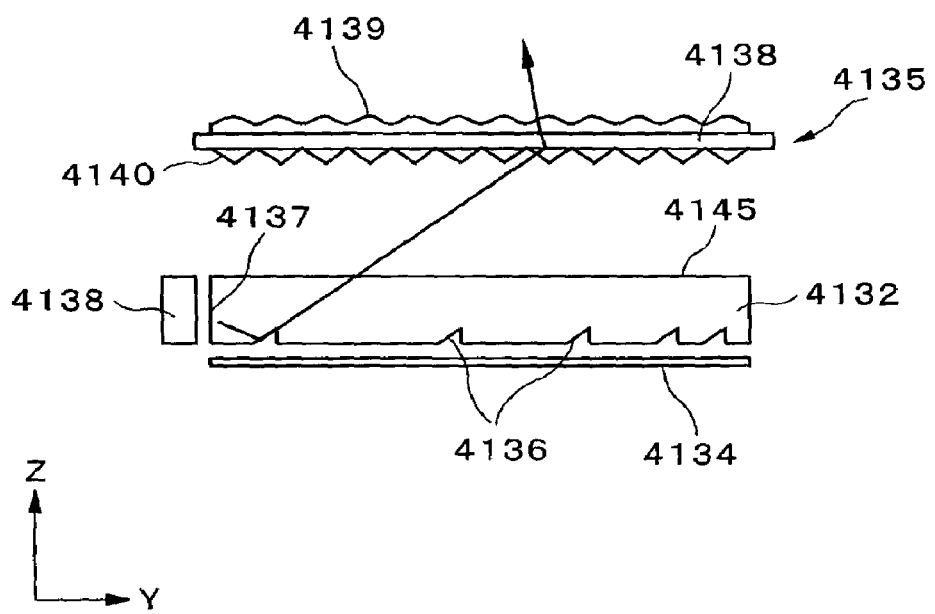
FIG. 41 is a sectional view showing the third conventional high-directivity light source device described in Japanese Laid-Open Patent Application 2003-215584.

The light source device, display device, terminal device, and optical member according to a fifth embodiment of the present invention will next be described. FIG. 33 is a sectional view showing the display device of the present embodiment; and FIG. 34 is a perspective view showing the louver of the present embodiment. As shown in FIG. 33, in the display device 24 of the present embodiment, cones 64 are formed directly on the louver 213 in the light source unit 14, and the cones 64 are not tilted, the same as in the first embodiment. As shown in FIG. 34, the lateral surfaces of the belt-shaped absorbent areas 112b provided to each layer of the louver 213 are tilted with respect to the Z-axis direction at a tilt angle of 11 degrees from the Z-axis. Aspects of the configuration in the present embodiment other than those described above are the same as in the previously described third embodiment.

In the fifth embodiment thus configured, since the generating lines (central axes) of the cones 64 are arranged parallel to the Z-axis direction, the light rays emitted from the optical waveguide that are refracted and totally reflected by the cone sheet are propagated in a direction approximately 11 degrees from the Z-axis direction. The lateral surfaces of the absorbent areas of the louver are also tilted 11 degrees from the Z-axis direction. Since the boundaries between the transparent areas and the absorbent areas in the louver are thus essentially aligned with the direction in which the light is emitted from the cone sheet, the louver can transmit the maximum amount of the light emitted from the cone sheet, specifically, the light propagated in the direction angled 11 degrees from the Z-axis direction. By this configuration, light loss by the louver can be further reduced, and the luminance during wide-angle display can be significantly enhanced. Other effects of the present embodiment are the same as in the previously described fourth embodiment.

The present invention can be suitable for use as the display device of a mobile telephone, a PDA, a gaming device, a digital camera, a video camera, or other mobile terminal device, and as the display device of a notebook-type personal computer, a cash dispenser, a vending machine, or other terminal device.

What is claimed is:

1. A light source device comprising:
   a light source;
   a light guiding member having an exit surface,
      wherein a reference plane is substantially parallel to the exit surface of the light guiding member, and
      wherein the light guiding member receives light from the light source and emits in a first direction which forms a first angle with respect to the reference plane, wherein the first direction is different from a direction in which light is emitted from the light source;
   an optical member which receives light emitted from the light guiding member and emits light in a second direction which forms a second angle, different from the first angle, with respect to the reference plane;
   a light-direction regulating element, which receives light emitted from the optical member, for regulating a direction of emitted light; and
   a transparent/scattering state switching element, which receives light emitted from the light-direction regulating element, capable of switching between a state of transmitting light without scattering, and a state of scattering light;
   wherein
      the light source is disposed along a light-incident surface of the light guiding member;
      the optical member comprises a plurality of optical elements having a projection shape and two-dimensionally arranged in a plurality of rows and columns on a light-incident surface thereof, the plurality of optical elements pointing toward the light guiding member; and
      the optical member totally reflecting light that has been emitted from the light guiding member, entered the optical elements, and reached side surfaces of the optical elements, and emitting the light; thus light that has been transmitted through the optical member has a directivity that is increased in two perpendicular directions in the reference plane.

2. The light source device according to claim 1, wherein the optical member comprises:
   substantially planar plate of a transparent material; and
   the plurality of optical elements which are disposed on a light-incident surface of the plate, wherein each of the plurality of optical elements comprises a circular cone of a transparent material;
   wherein
   central axes of the plurality of optical elements are parallel to each other.

3. The light source device according to claim 2, wherein a phase of a spacing of optical elements arranged in at least a first row of optical elements differs from a phase of a spacing optical elements in at least a second row of optical elements.

4. The light source device according to claim 2, wherein the rows and columns of the optical elements are uniformly spaced.

5. The light source device according to claim 2, wherein the central axes of the plurality of optical elements form acute angles with respect the light incident surface of the plate, such that the second direction is orthogonal to the light incident surface of plate.

6. The light source device according to claim 2, wherein the optical member further comprises a diffusion pattern formed on a light exit surface of the plate.

7. The light source device according to claim 1, wherein the light source comprises a point light source; and the light guiding member comprises a diffusion pattern formed on a light incident surface thereof.

8. The light source device according to claim 1, wherein the light guiding member comprises an optical waveguide comprising the light exit surface, a lateral light incident face, and a surface opposite the light exit surface, and
the surface opposite the light exit face includes a tilted surface, a plane of which forms an acute angle with respect to the reference plane.

9. The light source device according to claim 1, further comprising a reflecting sheet disposed on a surface of the light guiding member, opposite the light exit surface.

10. The light source device according to claim 1, wherein the light-direction regulating element comprises transparent areas, which transmit light incident thereon, and absorbent areas, which absorb light incident thereon;
the transparent areas and the absorbent areas are alternately disposed in a direction parallel to the reference plane; and
wherein light emitted from the light-direction regulating element has a directivity, in a direction orthogonal to the reference plane, greater than a directivity of light incident on the light-direction regulating element.

11. The light source device according to claim 10, wherein the light-direction regulating element comprises a first layer and a second layer, wherein an arrangement direction of the transparent areas and the absorbent areas in the first layer is orthogonal to an arrangement direction of the transparent areas and the absorbent areas in the second layer.

12. The light source device according to claim 10, wherein the transparent areas comprise discreet areas, surrounded by the absorbent areas, arranged in a matrix as viewed from the direction orthogonal to the reference plane.

13. The light source device according to claim 12, wherein the discreet areas are one of circular, elliptical, square, and rectangular, as viewed from the direction orthogonal to the reference plane.

14. The light source device according to claim 10, wherein the boundaries wherein a thickness of a transparent area meets a thickness of an absorbent area are parallel to the second direction.

15. The light source device according to claim 10, wherein the transparent areas are arranged in rows and columns, and the rows and columns of the transparent areas form acute angles with respect to the rows and columns of the optical elements.

16. The light source device according to claim 1, wherein the light-direction regulating element is integrally formed with optical member.

17. The light source device according to claim 1, wherein the light source is disposed along the light-incident surface of the light guiding member.

18. The light source device according to claim 17, wherein the light source is a cold cathode tube.

19. A display device comprising:
the light source according to claim 1; and
a display panel which receives light incident from the light source and form an image therewith.

20. The display device according to claim 19, wherein pixels of the display panel are arranged in rows and columns which form acute angles with respect to the rows and columns of the optical elements.

21. The display device according to claim 19, wherein the display panel is a liquid crystal panel.

22. The display device according to claim 21, wherein the liquid crystal panel operates on a lateral field principle, a multi-domain vertical alignment principle, or a film-compensated TN principle.

23. A terminal device comprising the display device according to claim 19.

24. The terminal device according to claim 23, comprising a mobile telephone, a personal information terminal, a gaming device, a digital camera, a video camera, a video player, a notebook-type personal computer, a cash dispenser, or a vending machine.

25. The terminal device according to claim 24 comprising a mobile telephone, wherein the light source is disposed above or below the display screen, as viewed by a user.

26. A light source device comprising:

a light source for emitting diffused light;

a light-guiding plate having a side surface on which light from the light source is incident, and having a light-exiting surface, and a light-diffusing surface opposite the light-exiting surface, wherein:

the side surface of the light guiding plate is spaced from the light source in a +X direction, and wherein the light-exiting surface is substantially planar in an X-Y plane;

the light-diffusing surface comprises a slanted portion, an outer surface of which is tilted towards a +X direction;

an optical member which receives light output from the light guiding plate, the optical member comprising a plurality of projections arranged in a plurality of rows and columns on a light-incident surface thereof, facing the light-exiting surface of the light-guiding plate, wherein light is totally internally reflected at interior side surfaces of the projections and directed to a light-exiting surface of the optical member, thus narrowing a range of angles, in the Y direction, over which light is output from the optical member;

a light-direction regulating element which receives light output from the optical member, the light-direction regulating element modifying a diffusion, in a Y direction, of emitted light; and a transparent/scattering state switching element having a light incident surface on which light from the light-direction regulating element is incident, the transparent/scattering state switching element capable of switching between a first state of transmitting, without scattering, light incident from the light-direction regulating element, and a second state of scattering light incident from the light-direction regulating element.

* * * * *